US010244565B2

(12) United States Patent
Morgan

(10) Patent No.: US 10,244,565 B2
(45) Date of Patent: Mar. 26, 2019

(54) SYSTEMS AND METHODS FOR A SUPPLEMENTAL DISPLAY SCREEN

(71) Applicant: Brent Foster Morgan, Scottsdale, AZ (US)

(72) Inventor: Brent Foster Morgan, Scottsdale, AZ (US)

( * ) Notice: Subject to any disclaimer, the term of this patent is extended or adjusted under 35 U.S.C. 154(b) by 0 days.

(21) Appl. No.: 16/013,274

(22) Filed: Jun. 20, 2018

(65) Prior Publication Data

US 2018/0302938 A1 Oct. 18, 2018

Related U.S. Application Data

(63) Continuation of application No. 15/646,001, filed on Jul. 10, 2017, now Pat. No. 10,009,933, which is a (Continued)

(51) Int. Cl.
*H04W 84/12* (2009.01)
*H04W 76/10* (2018.01)
(Continued)

(52) U.S. Cl.
CPC .......... *H04W 76/10* (2018.02); *G06F 3/1454* (2013.01); *G06F 9/452* (2018.02); *G09G 5/12* (2013.01);
(Continued)

(58) Field of Classification Search
CPC ......... G06F 3/14; G06F 3/0346; H04L 29/06; H04W 88/16; H04W 84/12
See application file for complete search history.

(56) References Cited

U.S. PATENT DOCUMENTS 6,401,013 B1 6/2002 McElreath
6,931,463 B2 8/2005 Striemer
(Continued)

FOREIGN PATENT DOCUMENTS

EP 2872964 A1 5/2015
WO WO 2014/088475 A1 6/2014

OTHER PUBLICATIONS

AT&T, "Integrated Laptops and Tablets," AT&T Business Direct Premier Business Center, https://www.wireless.att.com/businesscenter/solutions/wirelesslaptop/intedrateddevices/index.jsp, Accessed Aug. 17, 2016.
(Continued)

*Primary Examiner* — Chi Ho A Lee
(74) *Attorney, Agent, or Firm* — Knobbe, Martens, Olson & Bear LLP

(57) ABSTRACT

A supplemental display device is configured to be used with a first computing device having a first display. The supplemental display device has a touchscreen display and a control system. The control system is configured to wirelessly connect with the first computing device, access application icons from the first computing device, the icons corresponding to applications installed on the first computing device, display the application icons on the touchscreen display, detect an orientation of the supplemental display device, orient the application icons on the touchscreen display in accordance with the detected orientation of the supplemental display device and independent of an orientation of the first computing device, capture a user input on the touchscreen display, transmit the user input to the first computing device, and wirelessly receive content transmitted from the first computing device, wherein the content is transmitted from the first computing device at least partly in response to the captured user input.

30 Claims, 11 Drawing Sheets

Related U.S. Application Data continuation-in-part of application No. 15/289,527, filed on Oct. 10, 2016, now Pat. No. 9,720,639.

(60) Provisional application No. 62/382,878, filed on Sep. 2, 2016.

(51) Int. Cl.

| | | |
|---|---|---|
| *G06F 3/14* | (2006.01) | |
| *G09G 5/12* | (2006.01) | |
| *G06F 9/451* | (2018.01) | |
| *H04W 4/80* | (2018.01) | |
| *G06F 3/041* | (2006.01) | |
| *G06F 3/0481* | (2013.01) | |
| *G06F 3/0484* | (2013.01) | |
| *G06F 3/0488* | (2013.01) | |

(52) U.S. Cl.
CPC ............ *G06F 3/041* (2013.01); *G06F 3/0488* (2013.01); *G06F 3/04817* (2013.01); *G06F 3/04845* (2013.01); *G06F 2203/0384* (2013.01); *G09G 2330/026* (2013.01); *G09G 2340/145* (2013.01); *G09G 2370/025* (2013.01); *G09G 2370/04* (2013.01); *G09G 2370/16* (2013.01); *H04W 4/80* (2018.02); *H04W 84/12* (2013.01)

(56) References Cited

U.S. PATENT DOCUMENTS

| | | | |
|---|---|---|---|
| 7,266,391 | B2 | 9/2007 | Warren |
| 7,523,226 | B2 | 4/2009 | Anderson |
| 7,911,409 | B1 | 3/2011 | Chatterjee et al. |
| 8,340,721 | B2 | 12/2012 | Moran et al. |
| 8,588,758 | B2 | 11/2013 | Ullrich |
| 9,383,961 | B2 | 7/2016 | Dusterhoff |
| 9,405,362 | B2 | 8/2016 | Wilson et al. |
| 2005/0004942 | A1* | 1/2005 | Madsen ............ H04L 41/0843 |
| 2006/0005186 | A1* | 1/2006 | Neil ................. G06F 9/4555 |
| | | | 718/1 |
| 2006/0140265 | A1* | 6/2006 | Igler .................. H04N 7/163 |
| | | | 375/240.01 |
| 2008/0246736 | A1 | 10/2008 | Han |
| 2009/0023389 | A1 | 1/2009 | Paryani |
| 2009/0167774 | A1 | 7/2009 | Want |
| 2009/0228820 | A1 | 9/2009 | Kim |
| 2010/0060572 | A1 | 3/2010 | Tsem |
| 2010/0122100 | A1* | 5/2010 | Strumper ............ G06F 12/0897 |
| | | | 713/320 |
| 2011/0062794 | A1* | 3/2011 | Vergoossen ............. H04L 12/12 |
| | | | 307/125 |
| 2011/0164175 | A1 | 7/2011 | Chung |
| 2011/0239142 | A1 | 9/2011 | Sleeves et al. |
| 2012/0081299 | A1 | 4/2012 | Xiao et al. |
| 2012/0162536 | A1 | 6/2012 | Sibilsky et al. |
| 2012/0178368 | A1 | 7/2012 | Fleck |
| 2012/0278331 | A1 | 11/2012 | Campbell |
| 2012/0309462 | A1 | 12/2012 | Micev |
| 2013/0033435 | A1 | 2/2013 | Raveendran |
| 2013/0081089 | A1 | 3/2013 | Kim |
| 2013/0151592 | A1* | 6/2013 | Jensen .................. H04L 67/42 |
| | | | 709/203 |
| 2013/0162523 | A1 | 6/2013 | Tomaszewski |
| 2014/0055344 | A1 | 2/2014 | Seo |
| 2014/0092005 | A1 | 4/2014 | Anderson |
| 2014/0092108 | A1 | 4/2014 | Moon et al. |
| 2014/0092259 | A1 | 4/2014 | Tsang |
| 2014/0223461 | A1* | 8/2014 | Hatambeiki ..... H04N 21/44218 |
| | | | 725/10 |
| 2014/0282751 | A1 | 9/2014 | Lee |
| 2014/0341108 | A1 | 11/2014 | Desai |
| 2014/0372558 | A1 | 12/2014 | Fontaine |
| 2015/0074541 | A1 | 3/2015 | Schwartz et al. |
| 2015/0138089 | A1 | 5/2015 | Angerbauer |
| 2015/0179143 | A1 | 6/2015 | Subramaniam et al. |
| 2015/0181050 | A1* | 6/2015 | Nishii ................ H04N 1/00307 |
| | | | 358/1.15 |
| 2015/0253930 | A1 | 9/2015 | Kozloski |
| 2015/0323983 | A1* | 11/2015 | Hobson ................. G06F 1/3203 |
| | | | 713/323 |
| 2016/0044519 | A1 | 2/2016 | Bai |
| 2016/0119685 | A1 | 4/2016 | Jain |
| 2016/0147498 | A1 | 5/2016 | Son et al. |
| 2016/0173564 | A1 | 6/2016 | He et al. |
| 2016/0181295 | A1 | 6/2016 | Wan |
| 2016/0216952 | A1 | 7/2016 | Zeung et al. |
| 2017/0115721 | A1* | 4/2017 | Tu ............................. G06F 1/32 |
| 2017/0199715 | A1* | 7/2017 | Manchinasetti ...... G06F 3/0346 |
| 2017/0230637 | A1 | 8/2017 | Wan |
| 2017/0236446 | A1 | 8/2017 | Gupta |

OTHER PUBLICATIONS

Engadget, "popSLATE gives your iPhone a second (not so useful) screen," https://www.engadget.com/2015/04/22/popslate-gives-your-iphone-a-second-not-so-useful-screen/. Apr. 22, 2015.

Ian Paul, "How to Turn your Android Phone and Windows 10 PC into a Dynamic Duo with Cortana," Hassle-Free PC/column/Hassle-Free-PC/, Jan. 15, 2016.

"InVue Security CT300 Commercial Tablet Security," InVue Security Products 2016.

PCT search Report/Written Opinion dated Jan. 29, 2018, Brent foster Morgan PCT/US2017/049330, 47 pp.

* cited by examiner

SYSTEMS AND METHODS FOR A SUPPLEMENTAL DISPLAY SCREEN

INCORPORATION BY REFERENCE TO ANY PRIORITY APPLICATIONS

Any and all applications for which a foreign or domestic priority claim is identified in the Application Data Sheet as filed with the present application are hereby incorporated by reference under 1 CFR 1.57.

BACKGROUND

The present invention is generally related to computing devices having wireless interfaces and displays.

DESCRIPTION OF THE RELATED ART

Many portable personal electronic devices utilize screen sizes of less than six inches to enable them to be more portable by fitting into pockets or small bags. While this small size provides portable convenience, the smaller screen size relative to desktop computers or portable tablet computers makes it more difficult for users to watch videos, read e-mail, type, and interact with the device.

SUMMARY

An aspect of the disclosure relates to electronic display replicator for a primary portable computing device may comprise a case, an electronic display screen coupled to the case, and a control system disposed within the case. The control system is configured to establish a wireless communication channel between the electronic display replicator and the primary portable computing device to allow the transposition of data from a display screen of the primary portable computing device onto the electronic display screen. The control system optionally allows the electronic display screen of the electronic display replicator to act in place of the first display to operate and control the primary portable computing device.

An aspect of the disclosure relates to a supplemental display device configured to be used with a first computing device having a first display, comprising: a casing; a touchscreen display; a control system disposed within the casing and electrically coupled to the touchscreen display, wherein the control system is configured to perform operations comprising: establish a direct wireless connection with the first computing device; access, using the direct wireless connection, application icons from the first computing device, the application icons corresponding to applications installed on the first computing device; display the application icons from the first computing device in a grid format on the touchscreen display; detect an orientation of the supplemental display device; orient the application icons on the touchscreen display in accordance with the detected orientation of the supplemental display device and independent of an orientation of the first computing device; capture a user input on the touchscreen display; transmit the captured user input to the first computing device, wherein the captured user input transmitted to the first computing device is configured to cause a corresponding action to be performed on the first computing device; and wirelessly receive content transmitted from the first computing device, wherein the content is transmitted from the first computing device at least partly in response to the transmitted captured user input.

An aspect of the disclosure relates to a computer implemented comprising: establishing, by a supplemental display device having a touchscreen display, a wireless connection with a first computing device having a first display; accessing, by the supplemental display device, a first plurality of application icons over the wireless connection from the first computing device, the first plurality application icons corresponding to applications installed on the first computing device; displaying, by the supplemental display device, the first plurality of application icons from the first computing device in a grid format on the touchscreen display of the supplemental display device; capturing a user touch on the touchscreen display of the supplemental display device; transmitting, by the supplemental display device, the captured user touch to the first computing device, wherein the captured user touch transmitted to the first computing device is configured to cause a corresponding action to be performed on the first computing device; and wirelessly receiving, by the supplemental display device, content transmitted from the first computing device, wherein the content is transmitted from the first computing device at least partly in response to the transmitted captured user touch.

An aspect of the disclosure relates to a computer-implemented method comprising: determining by a first device configuration data for the first device, wherein the first device hosts a communication and synchronization application; wirelessly transmitting the determined first device configuration data from the first device to a supplementary display device; determining, by the first device, a communication environment of the first device and generating corresponding communication environment data, the communication environment data indicating whether the first device is wirelessly connected to a WIFI access point and whether the first device has access to a cellular network; wirelessly transmitting the first device communication environment data from the first device to the supplementary display device, the communication environment data indicating whether the first device is wirelessly connected to a WIFI access point and whether the first device has access to a cellular network; receiving from the supplementary display device by the first device touch data corresponding to a user touch input on a touchscreen of the supplementary display device, the touch data including at least coordinate data corresponding to the user touch input; determining by the first device an action to be taken in response to the touch data received from the supplementary display device; taking, by the first device, the determined action; and wirelessly transmitting content associated with the taken action from the first device to the supplementary display device.

An aspect of the disclosure relates to a computer system, comprising: a touchscreen display; computing hardware; a first wireless networking interface; a second wireless networking interface; a third wireless networking interface; non-transitory memory that stores instructions that when executed by the computing hardware cause the computer system to perform operations comprising: accessing configuration data of the computer system; wirelessly transmitting the configuration data to a supplementary display device using the first wireless networking interface or the second wireless networking interface; determining a communication environment of the computer system and generating corresponding communication environment data, the communication environment data indicating whether the computer system is wirelessly connected to a network access point using the second wireless networking interface and indicating whether the computer system has access to a cellular network via the third wireless networking interface;

wirelessly transmitting the communication environment data to the supplementary display device; receiving from the supplementary display device touch data corresponding to a user touch input on a touchscreen of the supplementary display device, the touch data including at least touch coordinate data; determining at the computer system an action to be taken in response to the touch data, including at least the touch coordinate data received from the supplementary display device; and taking, by the computer system, the determined action.

An aspect of the disclosure relates to a non-transitory memory that stores instructions that when executed by a computing system cause the computer system to perform operations comprising: accessing configuration data of the computer system; wirelessly transmitting the configuration data to a supplementary display device using a first wireless networking interface or a second wireless networking interface; determining a communication environment of the computer system and generating corresponding communication environment data, the communication environment data indicating whether the computer system is wirelessly connected to a network access point using the second wireless networking interface and indicating whether the computer system has access to a cellular network via a third wireless networking interface; wirelessly transmitting the communication environment data to the supplementary display device; receiving from the supplementary display device touch data corresponding to a user touch input on a touchscreen of the supplementary display device, the touch data including at least touch coordinate data; determining an action to be taken in response to the touch data, including at least the touch coordinate data, received from the supplementary display device; and taking the determined action.

An aspect of the disclosure relates to a non-transitory memory that stores instructions that when executed by a computing system cause the computer system to perform operations comprising: identifying one or more applications installed on the computing system; accessing icon images corresponding to the one or more applications installed on the computing system; wirelessly transmitting the icon images corresponding to the one or more applications installed on the computing system to a supplementary display device; receiving from the supplementary display device touch data corresponding to a user touch input on a touchscreen of the supplementary display device, the touch data including at least touch coordinate data; determining based at least in part on the touch data, including at least the coordinate data, whether an application on the computer system is to be launched; in response to determining that an application on the computer system is to be launched, launching the application; and transmitting a user interface corresponding to the launched application to the supplementary display device.

An aspect of the disclosure relates to a method, comprising: identifying one or more applications installed on a first computer system; accessing, by the first computer system, icon images corresponding to the one or more applications installed on the first computer system; wirelessly transmitting, by the first computer system, the icon images corresponding to the one or more applications installed on the first computer system to a supplementary display device; receiving, at the first computer system from the supplementary display device, touch data corresponding to a user touch input on a touchscreen of the supplementary display device; determining, by the first computer system, based at least in part on the touch data, whether an application on the first computer system is to be launched; in response to determining that an application on the first computer system is to be launched, launching the application; and transmitting data corresponding to the launched application to the supplementary display device.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

DESCRIPTION

The present technology may be described in terms of functional block components and various processing steps. Such functional blocks may be realized by any number of components configured to perform the specified functions and achieve the various results. For example, the present technology may employ various types of portable computing devices, display systems, communication protocols, networks, software/firmware, and the like. In addition, the present technology may be practiced in conjunction with any number of electronic devices and communication networks, and the system described is merely one exemplary application for the technology.

Systems and methods for an electronic display replicator according to various aspects of the present technology may operate in conjunction with any suitable portable electronic device and communication network. Various representative implementations of the present technology may be applied to any system for communicating information/data between two electronic devices.

Figure 1:
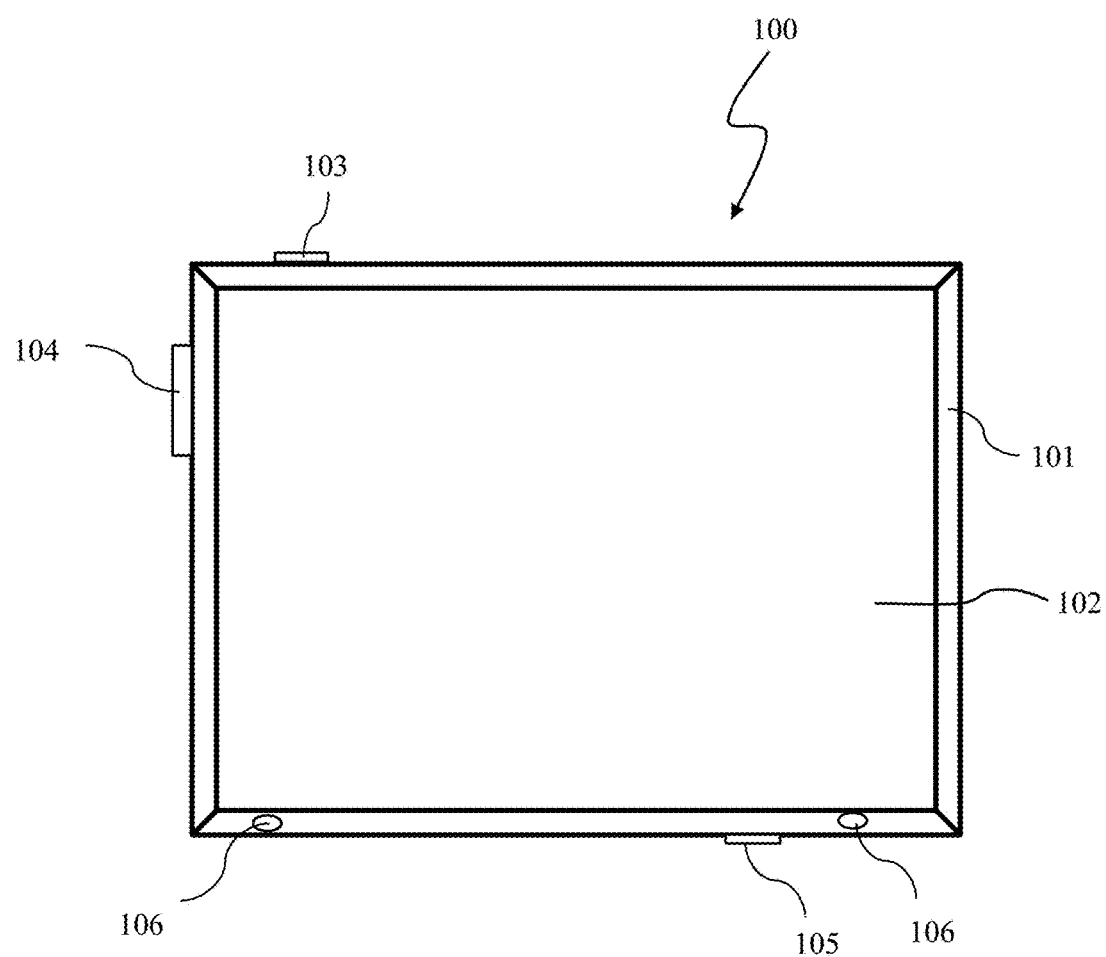
FIG. 1 representatively illustrates an example electronic display replicator according to one embodiment of the technology.
Figure 2:
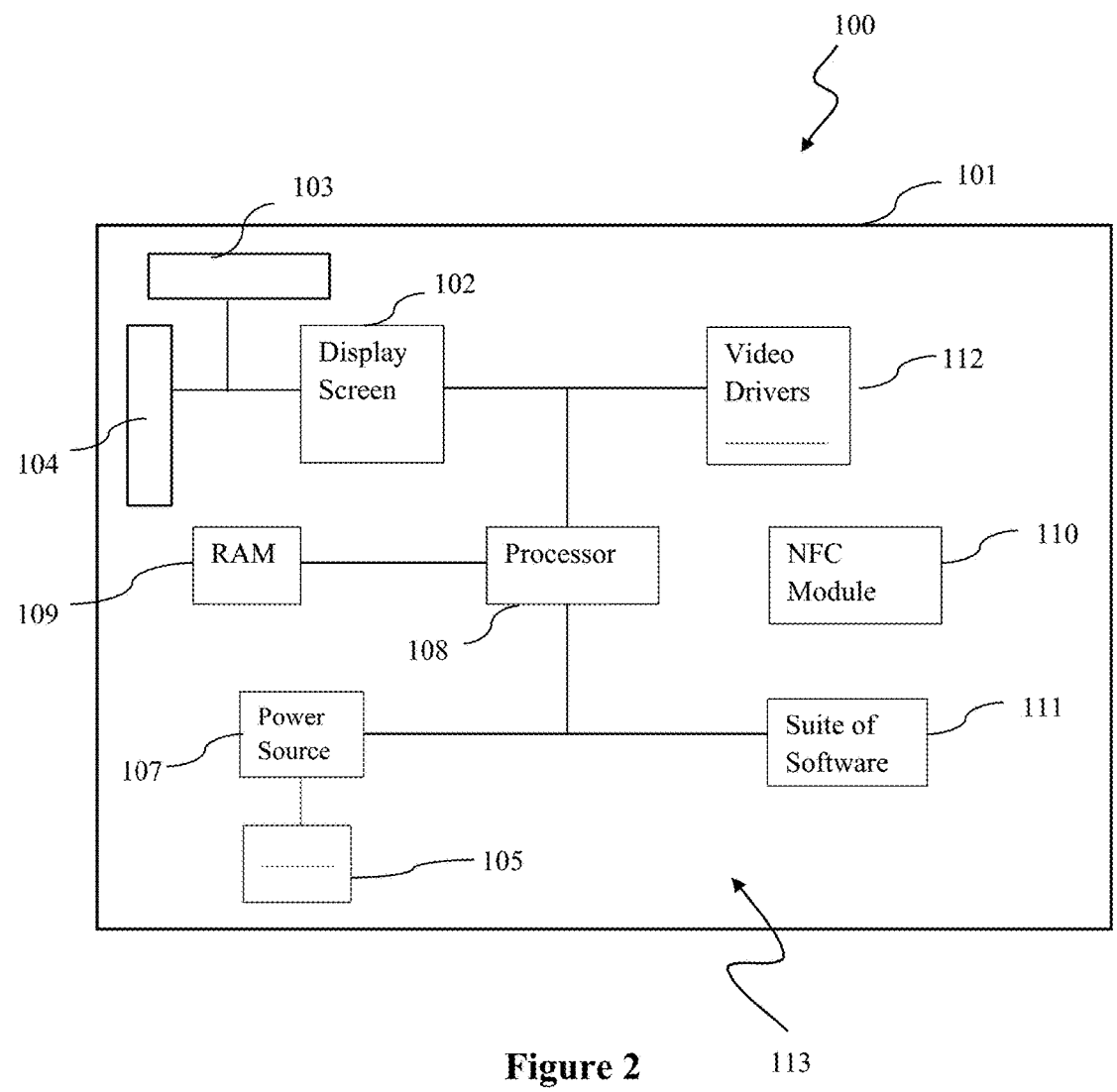
FIG. 2 representatively illustrates the various components of the example electronic display replicator.
Figure 3:
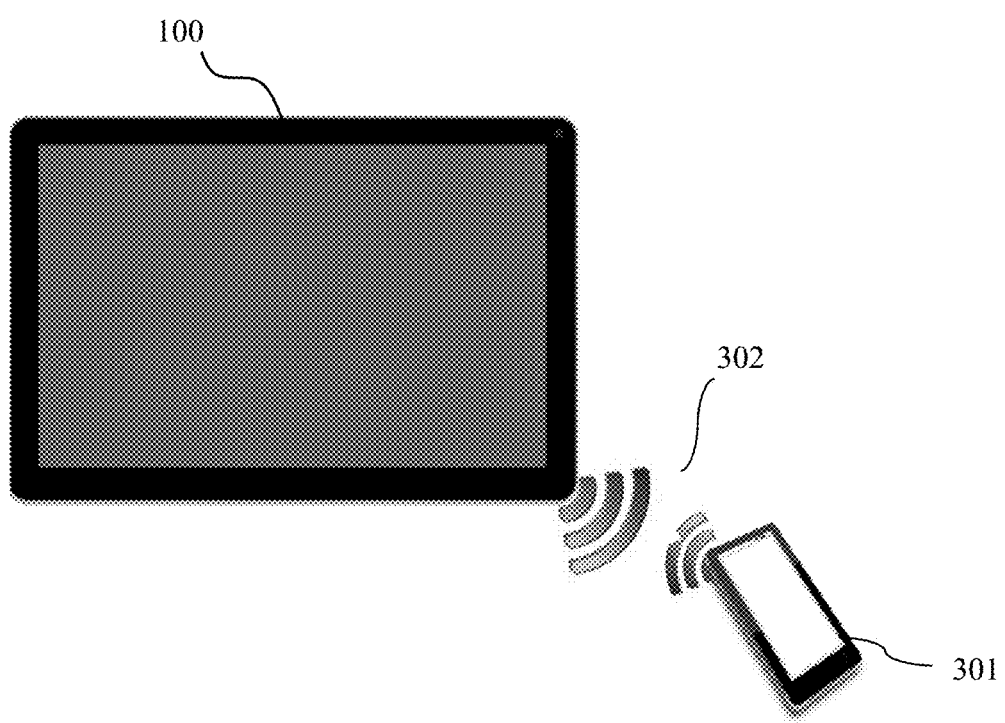
FIG. 3 representatively illustrates the example electronic display replicator communicatively coupled to a primary portable computing device.

Referring now to FIGS. 1-3, an example electronic display replicator 100 may be configured to operate in conjunction with a primary portable computing device 301. The example electronic display replicator 100 may be configured to receive information and/or data from the primary portable computing device 301 via a wireless communication channel 302 established between the electronic display replicator 100 and the primary portable computing device 301. The electronic display replicator 100 may further be configured to operate the primary portable computing device 301 based on input commands received from a user.

Referring now to FIGS. 1 and 2, optionally the electronic display replicator 100 may comprise a casing 101 configured to hold a display screen 102. The casing 101 may comprise any suitable device or system for housing, holding, or otherwise enclosing various components. For example, the casing 101 may comprise an upper surface (not shown) and a lower surface (not shown). The upper and lower surface may be coupled together to form an interior volume suitably configured to house a plurality of electronic components and the display screen 102.

The casing 101 may comprise any material such as plastics, metals, composite, and/or the like such as: aluminum; molded polymers; polymer-based composites; fiber-reinforced polymers; injection molded polycarbonate; acrylonitrile butadiene styrene ("ABS") plastic; polypropylene; polyethylene; and polystyrene; polyvinyl chloride ("PVC"); or any suitable combination or mixture thereof. The casing 101 may be manufactured as a single piece, or the casing 101 may be manufactured in separate pieces and then later assembled into a single piece.

The casing 101 may comprise one or more functional control options 103, 104, 105 to allow a user to control or operate various aspects of the electronic display replicator 100. The control options 103, 104, 105 may comprise any suitable system or device configured to operate the electronic display replicator 100, control functions, and/or its various components. The control options 103, 104, 105 may be electrically and/or communicatively coupled to the various electrical components of the electronic display replicator 100. The control options 103, 104, 105 may comprise any suitable button, dial, slider, switch, tab such as: volume controls; on/off controls; a charging port; audio port; and/or the like. The control options 103, 104, 105 may be configured to be affixed to the casing 101, detachably coupled to the casing 101, integrated with or into the casing 101, and/or otherwise positioned along an outer surface of the casing 101.

For example, the control option for a power switch 103 may be electrically and/or communicatively coupled to a component of the electronic display replicator 100 configured to turn the electronic display replicator 100 on and off. In another example, a charging port control option 105 may be electrically and/or communicatively coupled to a power source (battery) 107 such that the charging port control option 105 is configured to provide electrical power to the power source 107 to facilitate charging.

Optionally, the electronic display replicator may comprise sound system 106. The sound system 106 may comprise any suitable system or device configured to emit an audible sound. For example, the sound system 106 may comprise a set of speakers configured to emit audible information regarding either one of the electronic display replicator 100, the primary portable computing device 201, and/or a combination of the two via the wireless communication channel 202.

Optionally, some control options may be displayed on the display screen rather than embodied as a physical control button or switch. In such a configuration, one or more control options may be provided to the user via the electronic display screen 102 once the electronic display replicator 100 has been turned on and/or otherwise activated. For example, the control options may appear on the electronic display screen 102 such that the user can use their finger to activate the various control options for volume, brightness, and/or the like.

Optionally, the electronic display replicator 100 may also be configured to be powered on without the need for a physical toggle and/or an on/off switch. For example, the electronic display replicator 100 may be configured to power on in response to the display screen 102 being touched in a particular location or sense when an operator is in close proximity to the screen and then power the electronic display replicator on in reaction to the sensed presence. For example, the electronic display replicator 100 may be configured to automatically power itself on and/or otherwise activate itself when it senses the user is within a certain proximity (e.g., within 2 mm of the electronic display screen 102). Alternatively, the electronic display replicator 100 may be suitably configured to sense a touched pattern on the display screen 102 and power on in response.

Optionally, the plurality of control options 103, 104, 105 may be positioned at any suitable location of the casing 101. For example, the control option for the power switch 103 may be disposed anywhere along the perimeter of the casing 101. The control options may be disposed on the surface of the casing 101.

Now referring to FIG. 2, optionally, the casing 101 may be configured to receive the electronic display screen 102. The casing 101 may be disposed around a perimeter of the electronic display screen 102 and while also enclosing the plurality of electronic components within the casing 101.

The electronic display screen 102 may comprise any suitable system or device configured to display images, information, and/or data. For example, the electronic display screen 102 may comprise a thin-film display device such as an LCD (e.g., TFT LCD) or AMOLED screen. The electronic display screen 102 may comprise a rigid and/or flexible display. The electronic display screen 102 may be configured to display information and/or data in a variety of configurations. For example, the electronic display screen 102 may be configured to display information and/or data in standard definition, high definition, ultra-high definition, and/or any other suitable format. The electronic display screen 102 may be configured to display information in color, grayscale, black and white, and/or anything in between.

The electronic display screen 102 may comprise any suitable system or device configured to receive inputs. For example, the electronic display screen 102 may be configured with capacitive touchscreen capabilities such that the electronic display screen 102 may receive inputs via physical manipulation of the electronic display screen 102. The electronic display screen 102 may also comprise other touchscreen capabilities such as resistive touch and the like.

The electronic display screen 102 may comprise any suitable size or dimension. The electronic display screen 102 may be sized to provide the user with a larger display/viewing area than would otherwise be provided by the primary portable computing device's 201 native display screen. It is understood by those in the art that screen sizes are typically measured diagonally across the screen. For example, the electronic display screen 102 may optionally comprise a 9.7-inch display and may optionally have an aspect ratio of 16 by 9. By way of further example, the electronic display screen 102 may optionally comprise a 10.07-inch display and may optionally have an aspect ratio of 16 by 10, with an active area of 216.96 mm by 135.6 mm. The electronic display screen 102 may be configured to display data and/or information in any suitable resolution and/or aspect ratio. For example, aspect ratios of the electronic display screen 102 and/or primary portable computing device 301 display may further comprise 1:1, 5:4, 4:3, 3:2, 8:5, 5:3, 16:9, 16:10, 17:10. 1.48:1, 1.85:1 and/or other aspect ratios (and their inverse). The resolution may comprise standard definition, high definition, ultra-high definition 4K, and/or the like.

Additionally, the form factor of the electronic display screen 102 and/or the electronic display replicator 100 may provide a user with enhanced capabilities and features not otherwise provided by the primary portable computing device alone 201. For example, the larger form factor of the electronic display screen 102 may be easier to use as it provides the user with an increased surface area to perform tasks, provide input, view data, and/or the like. Disposing the various electronic components within a larger form factor case may provide the electronic display replicator 100 with enhanced cooling/heat reduction capabilities because the various electronic components do not have to be configured to be as close in proximity as would be required in a smaller form factor such as those found in the primary portable computing device 301. Furthermore, in certain optional configurations, the electronic display replicator 100 does not require all of the same components found within the primary portable computing device 301 because in certain optional configurations the electronic display replicator 100 is not used to perform as complex processing or computing functions as the primary portable computing device 301. For example, in certain optional configurations, the example primary portable computing device 301 is used to perform all native functioning allowing the electronic display replicator 100 to act solely as a larger display system for the primary portable computing device 301. By having fewer components, such configurations the electronic display replicator 100 may be more lightweight, provide a longer lasting battery life, thinner/less bulky, more reliable, and easier to operate compared to a normal tablet computing device and/or smartphone. However, other configurations of the electronic display replicator 100 may include robust processing power and specialized graphic processing devices, may have greater processing capabilities than a conventional cell phone, and may be configured to perform complex computing and processing functions. For example, the electronic display replicator 100 may optionally include a multicore graphics processing unit configured to decode and render video content, and configured to perform computationally intensive transform, clipping, and lighting calculations. The electronic display replicator 100 may be heavier or lighter, provide a longer or shorter battery life, be thicker or thinner/less bulky, more or less reliable compared to a conventional tablet computing device and/or smartphone. The electronic display replicator 100 may be configured to charge the portable computing device 201 via a wired connection (e.g., USB-C, microUSB, Lightning, etc.) and/or a wireless connection (e.g., via induction charging).

Optionally, the electronic display replicator 100 may be configured with a processor 108, a graphics card or circuit, and a memory 109. The processor 108 may comprise any suitable device configure to provide processing capabilities. The processor 108 of the electronic display replicator 100 may optionally be configured to operate only the primary portable computing device 301 and its various capabilities/features. For example, the processor 108 of the electronic display replicator 100 may be configured to analyze, determine, and/or otherwise parse the data/information related to the primary portable computing device 301 to determine a graphical user interface to display to a user operating the electronic display replicator 100 and/or the electronic display screen 102.

The processor 108 of the electronic display replicator 100 may be configured to receive user inputs (e.g., touch inputs via a finger or stylus) via the electronic display screen 102 and operate the primary portable computing device 301 using the reproduced graphical user interface of the electronic display replicator 100. In such a configuration, the electronic display screen 102 may optionally act simply an extension of the primary portable computing device 301 providing a larger viewable area than could otherwise be displayed on the primary portable computing device 301 itself. Optionally, the electronic display replicator 100 may execute applications that are installed on the primary portable computing device 301 or the applications may be executed by a remote server, or the applications may be executed using a combination of the primary portable computing device 301, the electronic display replicator 100, and a remote server, as described in greater detail elsewhere herein.

The processor 108 may be configured to process data received via the wireless communication channel 302. For example, when the wireless communication channel 302 is established, data from the primary portable computing device 301 may be transmitted to the electronic display replicator 100 for display. The processor may be configured to process the data to determine whether an action needs to be taken on the electronic display replicator 100 and/or the primary portable computing device. The memory 109 may comprise any suitable device configured to provide memory capabilities and/or operate in conjunction with the processor 108 to provide processing/memory capabilities to the electronic display replicator 100.

Referring now to FIGS. 2 and 3, optionally, the electronic display replicator 100 may be configured with a near-field communication (NFC) module 110. The NFC module 110 may comprise any suitable system or device configured to create, facilitate, operate, and/or manage a wireless communication channel 302 between the electronic display replicator 100 and a primary portable computing device 301. The wireless communication channel 302 may comprise any suitable connection configured to relay operational commands and/or data between the electronic display replicator 100 and the primary portable computing device 301. Optionally, the NFC module is configured to operate over a very short range of the primary portable computing device 301 (e.g., 4 cm or less, 6 cm or less, 10 cm or less).

The electronic display replicator 100 may optionally comprise a control system 113 configured to operate in conjunction with a NFC module 110, a suite of software 111, and various other components in creating, facilitating, operating, and/or managing the wireless communication channel 302. The control system 113 and/or the suite of software 111 may be configured to establish a wireless communication channel between the electronic display replicator 100 and the primary portable computing device 301 to facilitate the transposition and/or reproduction of data from a native display screen of the primary portable computing device 301 onto the electronic display screen 102. For example, the electronic display replicator 100 may be configured to receive an input via the electronic display screen 102 to create a wireless communication channel 302 with the primary portable computing device 301. The NFC module 110 may communicate this request to the suite of software 111. The suite of software 111 may then be configured to create the wireless communication channel 302 between the electronic display replicator 100 and the primary portable computing device 301.

Optionally, the suite of software 111 may comprise any software configured to operate on, or in conjunction with, an electronic device, network, and related components. For example, the suite of software 111 may be configured to establish the wireless communication channel 302. In another example, the suite of software 111 may be further configured to sense user inputs, transmit the sensed inputs to the primary portable computing device 301, transmit/receive information/data, process information/data, and/or perform other tasks related to the operation of the electronic display replicator 100.

Optionally, the wireless communication channel 302 may comprise any suitable communication channel between the primary portable computing device 301 and the electronic display replicator 100. For example, the wireless communication channel 302 may comprise any suitable radio frequency such as those used for Bluetooth® (e.g., Bluetooth® class 1, 2, Bluetooth 4.1, Bluetooth LE, or other variant), WIFI, 802.11 and/or the like. The wireless communication channel 302 may be configured to be bidirectional such that information may travel back and forth from the primary portable computing device 301 and the electronic display replicator 100. The wireless communication channel 302 may be configured to facilitate the transmission of various types of data including, but not limited to, video, audio, configuration settings, graphical user interface data, security data (e.g., passwords, cryptography keys, biometric data, etc.), environmental data, sensor data, user inputs, and/or the like. The wireless communication channel 302 may be configured with a bandwidth sufficient to accommodate the transmission of the various data types. For example, larger bandwidth may be required to transmit video data compared to text data.

Optionally, the wireless communication channel 302 between the electronic display replicator 100 and the primary portable computing device 301 may be established automatically, semi-automatically, and/or manually. Optionally, the wireless communication channel 302 may be configured to exist only between the electronic display replicator 100 and the primary portable computing device 301. In other words, the wireless communication channel 302 is configured for 1-to-1 communication. For example, the wireless communication channel 302 may be automatically created when the electronic display replicator 100 is powered on and positioned within a certain geographical proximity to the primary portable computing device 301.

Optionally, the wireless communication channel 302 may be semiautomatically created by the user using the electronic display replicator 100. For example, the electronic display replicator 100 may be configured with a "create communication channel" option such as a button/toggle/switch. When the "create communication channel" button/toggle/switch is activated, the electronic display replicator 100 may attempt to automatically create a wireless communication channel 302 with the primary portable computing device 301. For example, if the primary portable computing device 301 has previously been used in conjunction with the electronic display replicator 100, either the primary portable computing device 301 and/or the electronic display replicator 100 may be configured to store information/data regarding that previous connection such that future wireless communication channels 202 between the two device may be created using the stored information/data.

The wireless communication channel 302 may also be created manually. The electronic display replicator 100 and/or the primary portable computing device 301 may be configured to receive information/data regarding each device. For example, the electronic display replicator 100 may be configured to receive information/data regarding the primary portable computing device 301 such as the device identification data, login/password information, network identification data, the device WIFI address, the device Bluetooth address, the device IMEI, the device ICCID, the device MEID, and/or the like. Similarly, the primary portable computing device 301 may be configured to receive similar information/data regarding the electronic display replicator 100 such that a wireless communication channel 302 may be created between the two devices.

Now referring to FIG. 3, optionally, the primary portable computing device 301 may comprise any suitable electronic device such as a mobile phone, tablet, smart watch, vehicle display, and/or the like. The primary portable computing device 301 may be configured with any suitable system or device configured to create a wireless communication medium with another electronic device (e.g., the electronic display replicator 100). For example, the primary portable computing device 301 may be configured with its own NFC, Bluetooth, and/or WIFI modules configured to create the wireless communication channel 302 in conjunction with another device (e.g., the electronic display replicator 100). The primary portable computing device 301 may be disposed at a remote location relative to the electronic display replicator 100. For example, the primary portable computing device 301 may be disposed and/or otherwise be placed at a different geographical location relative to the electronic display replicator 100 but still within a certain distance proximity range to facilitate the creation of the wireless communication channel 302 between the electronic display replicator 100 and the primary portable computing device 301.

The wireless communication channel 302 may be configured to facilitate the bidirectional flow of information and/or data back and forth between the electronic display replicator 100 and the primary portable computing device 301. The wireless communication channel 302 may be utilized by the electronic display replicator 100 and the primary portable computing device 301 to transmit operational commands between the two devices. The operational commands may comprise any type of command, instruction, operation, and/or the like configured to be executed on an electronic device. For example, an operational command may comprise operating a feature of one of the devices (i.e., increase/decrease volume, operating the capacitive touchscreen of either device, or the like).

Optionally, the wireless communication channel 302 may be configured to allow the primary portable computing device 301 to maintain a separate wireless network connection to a local area network that is distinct and independent from the wireless communication channel 302 created between the two devices. For example, the portable computing device 301 may be communicatively linked to a local area network (such as WIFI) prior to establishing the wireless communication channel 302 with the electronic display replicator 100. After the wireless communication channel 302 has been established, the primary portable computing device 301 may still be communicatively connected to the local area network and transmit/receive data/information via the local area network.

Optionally, when the wireless communication channel 302 has been established between the electronic display replicator 100 and the primary portable computing device 301, the primary portable computing device 301 may be configured to be operated via the electronic display replicator 100. In other words, the electronic display replicator 100 may act as the controller for the primary portable computing device 301. The native display screen of the primary portable computing device 301 may be turned off, put into a sleep/hibernation mode, and/or otherwise disabled such that what was originally configured to be displayed on the native display screen of the primary portable computing display device 201 is now displayed in a larger format on the electronic display screen 102 of the electronic display replicator 100. Turning off, disabling, hibernating, and/or otherwise disabling the native display screen of the primary portable computing device 301 does not hinder the performance and/or capabilities of the primary portable computing device 301. Rather, instead of displaying the information on the native display screen of the primary computing device 301, the information is instead transposed and/or reproduced on the electronic display replicator 100.

Optionally, the electronic display replicator 100 may be configured to operate the primary portable computing device 301 according to inputs received via the electronic display replicator 100. The received inputs received by the electronic display replicator 100 may be transmitted and/or otherwise communicated to the primary portable computing device 301 via the wireless communication channel 302 as discussed above. The received inputs by the electronic display replicator 100 may be performed by the primary portable computing device 301. For example, after the wireless communication channel 302 has been established, an instruction received by the electronic display replicator 100 to increase the volume setting may be communicated to the primary portable computing device 301 such that the volume produced by the primary portable computing device 301 is increased.

Similarly, the user may select to open an app displayed on the display screen 102 and the control system 113 may transmit the instruction to the primary portable computing device 301. The primary portable computing device 301 may then open the app which is then displayed on the display screen 102 of the electronic display replicator 100. The user may then interact with the app via the display screen 102 and in place of the screen of the primary portable computing device 301.

Optionally, the control system 113 may be configured to return the native display device of the portable computing device 301 to an active state in response to a user interaction with the primary portable computing device 301. The control system 113 may further cause the electronic display replicator 100 to enter into a hibernation state when the primary portable computing device 301 is returned to an active state. For example, the portable computing device 301 may comprise a cell phone that is communicatively linked to the electronic display replicator 100 via the wireless communication channel 302. The primary portable computing device 301 may receive a call which may require the user's attention. The incoming call may be configured to be displayed on the electronic display screen 102 of the electronic display replicator 100. Optionally, the electronic display replicator 100 may temporarily disable the wireless communication channel and/or disable the electronic display replicator 100 from controlling the primary portable computing device 301 so that the user may operate the primary portable computing device 301 as it is normally configured to be operated (i.e., without the electronic display replicator linked to it). Optionally instead, the electronic display replicator 100 does not disable the wireless communication channel and/or the electronic display replicator 100 from controlling the primary portable computing device 301 so that the user may operate the primary portable computing device 301 as it is normally configured to be operated (e.g., to take or initiate a phone call on the device 301, to access an app directly on the device 301, etc.).

Referring back to FIGS. 1-3, optionally, the plurality of control options 103, 104, 105 of the electronic display replicator 100 may be utilized to control similar functions/devices of the primary portable computing device 301. The plurality of control options of the electronic display replicator 100 may be mapped, linked to, associated with, and/or otherwise generally related to a similar function of the primary portable computing device 301. For example, the electronic display replicator 100 may comprise a control option 104 for volume control. Adjusting the volume control on the electronic display replicator 100 may cause the second device 201 to increase its volume.

Figure 4:
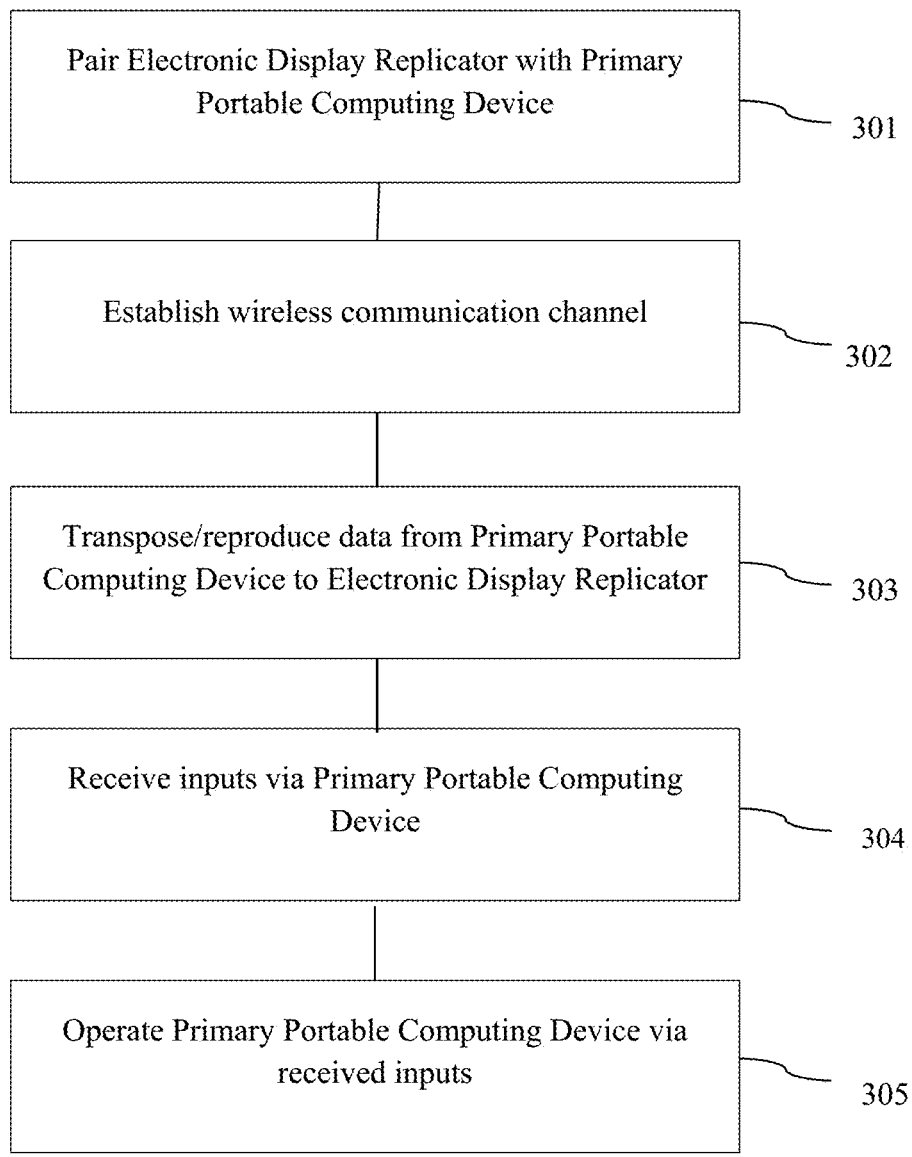
FIG. 4 representatively illustrates an example method of establishing a communication channel between the electronic display replicator and another electronic device.

Now referring to FIG. 4, the electronic display replicator 100 may optionally be configured to be paired and/or otherwise associated with a primary portable computing device 301 over a dedicated wireless connection. The pairing and/or association process may comprise any suitable system configured to pair and/or associate two devices together. For example, the electronic display replicator 100 and the primary portable computing device may be configured to share between each other any settings, configurations, access controls, network IDs, encryption, keys, and/or the like between each other to establish a pairing.

The control system 103 may be configured to transmit a signal to the primary portable computing device 301. The signal may be configured to activate a pairing protocol between the electronic display replicator 100 and the primary portable computing device 301. Once paired and/or associated together, the electronic display replicator 100 and the primary portable computing device 301 may store the pairing information for later use. For example, once the electronic display replicator 100 and the primary portable computing device 301 have been paired together for the first time, the two devices retain information regarding that pairing/association such that the two devices do not have to undergo the process again in the future.

When the two devices are paired and/or otherwise associated with each other, a wireless communication channel 302 may be established between the two devices (302). The wireless communication channel 302 may comprise any suitable system configured to establish a communication channel between two devices as discussed above. For example, the wireless communication channel 302 may comprise various wireless communication protocols such as Bluetooth®, WIFI, 802.11, radio frequency, and/or the like.

Optionally, after the wireless communication channel 302 has been established, data and/or information may be transposed and/or reproduced from the primary portable computing device 301 to the electronic display replicator 100 over the wireless communication channel 302 (303). The data and/or information may comprise any data and/or information regarding pictures, video, audio, and/or the like.

The data and/or information may also comprise data/information related to a data set comprising graphical user interface data. It is understood to those skilled in the art that a graphical user interface may comprise any suitable system configured to display information to a user. The graphical user interface may comprise text, icons/graphics, formatting layout, and the like. The graphical user interface data may be configured to allow the electronic display screen 102 to reproduce a graphical user interface meant to be displayed on the native display screen of the portable computing device 301. For example, the primary portable computing device 301 may provide to the electronic display replicator 100 via the wireless communication network 202 a graphical user interface data set such that the processor 108 of the electronic display replicator 100 may extract and/or otherwise retrieve from the graphical user interface dataset data/information to replicate, transpose, and/or otherwise reproduce the same graphical interface on the electronic display replicator 100 that would otherwise be configured to be displayed on the primary portable computing device 301.

The electronic display replicator 100 may receive a plurality of user inputs (304). The received inputs may comprise user created inputs (e.g., a user using the capacitive touchscreen of the electronic display replicator 100) and/or the received inputs may comprise inputs received from another electronic device. The received inputs may be provided to the processor 108 for processing to determine whether an action needs to be taken on either the electronic display replicator 100 and/or the primary portable computing device 301. The suite of software 111 may be configured to operate in conjunction with the processor 108. In one configuration, the bulk of the processing may performed by the primary portable computing device 301. The primary portable computing device 301 may be configured to provide the processed data to the electronic display replicator to transpose and/or otherwise reproduce.

Optionally, the plurality of user inputs received by the electronic display replicator 100 may be configured to operate the primary portable computing device 301 (305). For example, if the supplemental display screen 100 received inputs to open an application, the input may be transmitted to the primary portable computing device 301 so that the primary portable computing device 301 may open the application.

Further example architectures, processes, and features will now be described.

Figure 5:
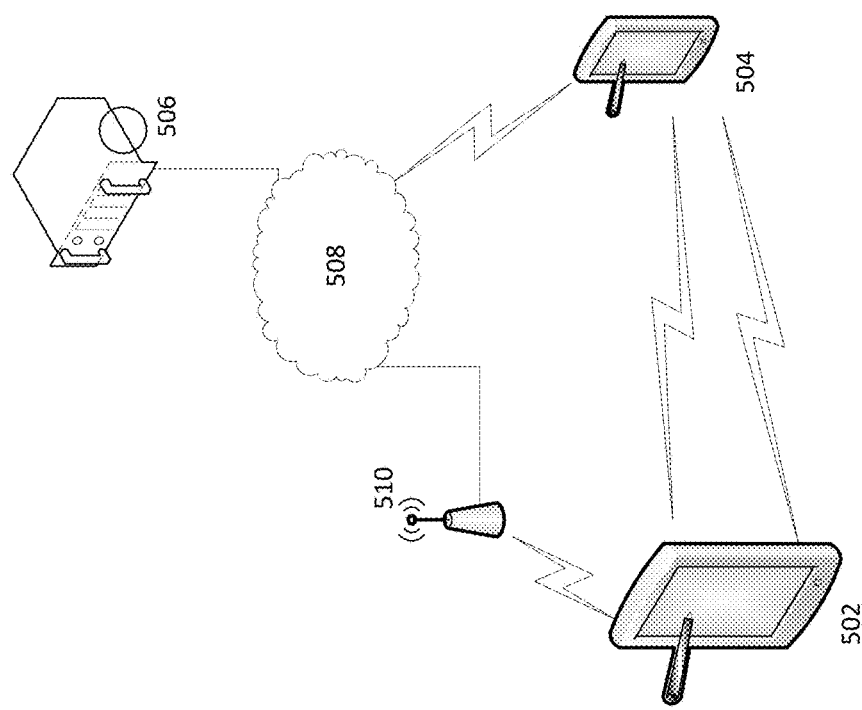
FIG. 5 illustrates an example operational architecture.

FIG. 5 illustrates an example operational architecture, including a supplemental display device 502, a first computing device 504 (e.g., which optionally may be the primary portable computing device 301), and a remote system 506, which may be a cloud-based server system. The first computing device 504 may have a smaller display than the supplemental display device 502 (although optionally, the supplemental display device 502 may have the same size display or a smaller display than that of the first computing device 504). For example, the supplemental display device 502 may have a display size of between 7.0-12.3 inches (or greater) in the diagonal, and the first computing device 504 may have a display size of between 1.0-6.9 inches in the diagonal. The supplemental display device 502, the first computing device 504, and the remote system 506 may communicate via one or more wireless and/or wired interfaces. The supplemental display device 502, the first computing device 504, and the remote system 506 may communicate over a wide area network, such as the Internet. Optionally, the supplemental display device 502 and/or the first computing device 504 may access the wide area network via an access point 510 if available. The supplemental display device 502 and the first computing device 504 may also communicate with each other via a local network, such as a WIFI Direct network and/or via Bluetooth®.

Optionally, different wireless interfaces may be used to communicate different types of instructions or data. For example and without limitation, the supplemental display device 502 and the first computing device 504 may include Bluetooth® (e.g., Bluetooth® class 1, 2, Bluetooth 4.1, Bluetooth LE (supporting Bluetooth® class 1, 2, and/or Bluetooth 4.1), or other variant) and WIFI 802.11 radios/interfaces. The supplemental display device 502 and/or the first computing device 504 may also include mobile communication radios/interfaces, such as cellular network radios/interfaces (e.g., 3G, 4G (e.g., LTE, HSPA, etc.), 5G or other variants of cellular technology).

Optionally, Bluetooth LE supporting Bluetooth 4.1 may be utilized to reduce or eliminate conflicts with the cellular radio (e.g., LTE radio) by coordinating the Bluetooth radio with the cellular radio so there is reduced or no overlap. Further, rather than utilizing a fixed timeout period, Bluetooth 4.1 enables the supplemental display device 502 to utilize custom-specified reconnection timeout intervals to better manage power utilization and to enable automatic powering up and down based on a custom power plan.

The supplemental display device 502 may optionally include some or all of the following: one or more touch displays (e.g., a 2K, 4K, 8K, or other resolution display, where the display may be a resistive or capacitive touchscreen, and may utilize LCD, OLED, AMOLED, or other display technology), a non-touch display, LED indicators, a CPU (e.g., a 64 bit multicore processor), a motion coprocessor, a graphics processor, volatile memory, non-volatile memory, a Bluetooth modem, one or more Bluetooth antennas, a WIFI modem, one or more WIFI antennas, a cellular modem, one or more cellular antennas, one or more front facing cameras, one or more rear facing cameras, an accelerometer, a tilt sensor, an orientation sensor, one or more speakers, one or more microphones, one or more ambient light sensors, one or more biometric sensors and systems (e.g., fingerprint reader, iris reader, camera, face recognition system, voice recognition system, and/or the like) to unlock the supplemental display device 502, make payments, and/or to access sensitive data (e.g., credit card information, account information, or the like), a rechargeable battery, and/or a wireless recharging circuit (e.g., an induction charging circuit). Optionally, the supplemental display device 502 may provide virtual simultaneous dual band operation (e.g., 2.4 GHz ISM Band (2.400-2.497 GHz)). The supplemental display device 502 may be configured to charge the first computing device 504 via a wired connection (e.g., USB-C, microUSB, Lightning, etc.) and/or a wireless connection (e.g., via induction charging).

The supplemental display device 502 may include an operating system (e.g., an Android-based operating system, and iOS-based operating system, a Windows-based operating system, a macOS operating system, a Linux-based operating system, or the like). The supplemental display device 502 may provide user access and control of the first device's operating system and data connections. The supplemental display device 502 may optionally include one or more physical ports. For example, supplemental display device 502 may include a physical port for charging and/or for digital communication, such as a USB port (e.g., USB-C, microUSB, etc.), a Lightning port, etc. The supplemental display device 502 may optionally include a memory port (e.g., an SD or microSD port) configured to removably receive a memory module (e.g., a non-volatile SD or microSD card).

The supplemental display device 502 may optionally include a physical volume control, a physical mute control, a physical screen rotation control (e.g., to prevent or permit rotation of the content displayed on the screen in response to the user rotating the supplemental display device 502), and/or a physical power on/off control. In addition or instead, some or all of the foregoing controls may be provided as "soft" controls accessed via a touch input device (e.g., a touchscreen).

As discussed in greater detail elsewhere herein, the supplemental display device 502 may scale content from the first computing device 504 so that the content is not blurred or chopped when rendered on the supplemental display device 502 display. For example, optionally the supplemental display device 502 may render raw content data from the first computing device 504 using the lesser of the supplemental display device display resolution and the resolution of the raw content data, so that the resolution of the first computing device 504 does not control the final viewed resolution on the supplemental display device 502. Thus, unlike conventional mirroring techniques, raw data may be transmitted bi-directionally between the supplemental display device 502 and the first computing device 504.

The supplemental display device 502 may be configured to automatically mute its speakers in response to detecting (via a message transmitted from the first computing device 504 to the supplemental display device 502) that the user is on a call on the first computing device 504 and/or that the user is playing audio content on the first computing device 504.

The supplemental display device 502 may optionally be configured to provide its services to a large variety of other computing device types, including without limitation tablets and phones using the Android operating system, the iOS operating system, the Windows operating system, and the like. By way of further example, the supplemental display device 502 may optionally be configured to provide its services to wearables (e.g., smart watches, medical devices, and the like), other Internet of Things (IoT) devices, car displays, appliances, and the like.

As described in greater detail elsewhere herein, optionally the supplemental display device 502 may utilize absolute positioning with respect to user touch inputs to avoid the technical problems of relative positioning (where the first computing device's standard mouse driver is used to read the supplemental display device 502 as a mouse HID), where the user would have to indicate a 0,0 position at the beginning of each session so that the supplemental display device 502 can calibrate user inputs.

Communication and synchronization between the supplemental display device 502 and the first computing device 504 may be managed using communication and synchronization applications respectively installed on the supplemental display device 502 and the first computing device 504. The communication and synchronization application installed on the supplemental display device 502 may provide different functionality than that of the communication and synchronization application installed on the first computing device 504 and may include different code. For example, as described in greater detail elsewhere herein, a communication and synchronization application may enable the supplemental display device 502 to unlock the first computing device 504, set up communication channels with the first computing device 504, control the first computing device display, launch applications on the first device 502, access the user interfaces of launched applications from the first user device 502, access data being received by such applications, display and/or play content being received by such applications, display app icons from the first computing device 504, display interfaces of the first computing device 504, and/or the like.

The communication and synchronization applications optionally may be downloaded from an application store or the applications may be preinstalled on either or both the supplemental display device 502 and the first computing device 504. For example, the communication and synchronization application or aspects thereof may be part of the operating system of the supplemental display device 502. The communication and synchronization application or aspects thereof may optionally be in the form of firmware. Optionally, certain services may be implemented in firmware (e.g., a haptic service, a sound service, and/or the like) and other services may be implemented in one or more installed software applications. The functionality of the communication and synchronization application may be divided among multiple applications.

Where the supplemental display device 502 uses a different operating system than the first computing device 504, and the communication and synchronization applications (or updates thereof) are to be downloaded, the supplemental display device 502 may download the application (or updates thereof) from a different application source (e.g., application store) than the first computing device 504. For example, if the supplemental display device 502 utilizes the Android operating system (which may be a customized/ forked version of the Android operating system), the communication and synchronization application may download the application and/or updates to the application from an Android application store, while if the first computing device 504 is utilizes an iOS operating system, the communication and synchronization application may download the application and/or updates to the application from an Apple application store. Optionally, the communication and synchronization application for the first computing device 504 may first be downloaded or otherwise provided to or installed on the supplemental display device 502, which may then transmit the communication and synchronization application to the first computing device 504 for installation thereon (e.g., via Wi-Fi Direct, Bluetooth, or otherwise).

The communication and synchronization application on the first computing device 504 may monitor one or more communication channels of the first computing device 504 (e.g., Bluetooth, Wi-Fi Direct, cellular, and/or the like), and detect if an instruction (which may correspond to user touch inputs received via the supplemental display device 502) has been received from the supplemental display device 502. The communication and synchronization application on the first computing device 504 may then cause such instruction to be executed by the first computing device 504.

Optionally, in order to provide secure communication, an asymmetric cryptographic algorithm may be utilized to ensure that information is not improperly accessed as it is being transmitted between the first computing device 504 and the supplemental display device 502. For example, the communication and synchronization application on the first computing device 504 may generate two keys. One of the keys may be securely stored on the first computing device 504 and the second key may be wirelessly transmitted to the supplemental display device 502.

The first key may be composed of a modulus and an encryption exponent, and the second key may contain the same modulus as the first key with a decryption exponent which may be securely stored on the supplemental display device 502. Thus, the two keys may have a common element in the modulus, but may have different elements in their exponents.

After the key exchange has been performed, the supplemental display device 502 may utilize the keys to later identify and verify the identity of the first computing device 504 without having new keys generated.

To further enhance security, convenience, and flexibility, the supplemental display device 502 may optionally establish and utilize a single radio hop communication connection (e.g., Wi-Fi Direct) with the first computing device 504 such that the supplemental display device 502 and the first computing device 504 operate in a security domain without use of a separate wireless access point. Optionally, a Wi-Fi Direct connection/pairing may be established using a Bluetooth or NFC communication. Optionally, the Wi-Fi Protected Access II (WPA2) protocol (or other security protocol) may be utilized but may be managed separately from the security system in an access point-based network (e.g., a home, enterprise, or hotspot access point).

For example, the supplemental display device 502 may execute a service, such as mDNS (multicast Domain Name Service) or other resolving service, which may be a zero-configuration service, that resolves host names to IP addresses (e.g., within networks that do not include a local name server), to perform a search to locate the first computing device 504. The supplemental display device 502 may then access and verify the encrypted keys to ensure that the first computing device 504 has been previously registered by the supplemental display device 502.

Optionally, certain data, such as publically available data not specific to the user and not confidential in nature, streamed from the Internet to the first computing device 504 and from the first computing device 504 to the supplemental display device 502 will not be so encrypted. Optionally, such data may be encrypted using simpler cryptography, such as salt cryptography where random data may be used as an additional input to a one-way function that hashes data.

Optionally, access to the supplemental display device 502 may be made further secure via password (e.g., an alphanumeric password) and/or biometric protection. For example, the supplemental display device 502 may enable a user to setup a password and/or biometric input which are required to unlock the supplemental display device 502. Optionally, two-factor authentication may be provided, wherein two authentication factors are used to authenticate a user (e.g., at least two of the following: a password, a PIN, a shared secret, a security token, another device (e.g., an ID card or laptop), or biometrics) in order to permit access the supplemental display device 502.

To further enhance security, the communication and synchronization application on the first computing device 504 may include a disable control that when activated causes the communication and synchronization application to prevent the supplemental display device 502 from communicating with or accessing the first computing device 504. Activation of the disable control may be stored in memory. This ensures that even if the supplemental display device 502 is lost or stolen, and even if the person who found or stole the supplemental display device 502 is able to penetrate the password and/or biometric protection features of the supplemental display device 502, and is within wireless range of the first computing device 504, the supplemental display device 502 would still not be able to control or access data from the first computing device 504.

The communication and synchronization application on the first computing device 504 may determine which applications are installed on the first computing device 504, and may optionally generate a custom user interface (which may include one or more screens) that displays the application icons in a grid of columns and rows. Optionally, the user may modify the placement of icons on the custom user interface generated by the communication and synchronization application (e.g., by dragging and dropping icons to new locations).

The layout of the application icons presented by the custom user interface may be different than, or the same as, the native layout of application icons. Thus, optionally, rather than viewing the native user interface of rows and columns of application icons, the user is viewing a user interface generated by the communication and synchronization application on the first computing device 504. This enables the supplemental display device 502 to have full access to the first computing device 504 display (e.g., for transferring raw data URLs and internal commands). For example, during initial setup, when the first computing device 504 and the supplemental display device 502 are paired, the communication and synchronization application on the first computing device 504 may access such information and pass it back to the supplemental display device 502 (e.g., via Bluetooth).

Optionally, the layout rendered on the supplemental display device 502 may be the same layout displayed on the user interface generated by the communication and synchronization application on the first computing device 504 (e.g., as a default). If the icons rendered on the larger display of the supplemental display device 502 are of the same size as the icons rendered on the smaller display of the first computing device 504 and if both devices have the same icon layout, there will be additional space available on the larger supplemental display device display that is not used to display applications icons. Optionally, the additional display space on the supplemental display device 502 may be used to display notifications, video playback, or other entertainment or work related data.

Optionally, a user interface may be provided via the supplemental display device 502 that enables a user to specify the grid size (e.g., in terms of the number of columns and row) that is to be used to display application icons on the supplemental display device 502. For example, the grid on the first computing device 504 may 4 columns and 6 rows (and so capable of displaying 24 application icons). However, the user interface may enable the user to specify (via respective fields or via a grid drawing tool) that a grid of 8 columns and 10 rows is to be used to display application icons on the supplemental display device 502 (and so capable of displaying 80 application icons). The supplemental display device 502 may then display the icons in a grid according to the user specification. Optionally, the user interface may enable the user to specify which application icons are to be displayed in a dock area, where the applications in the dock area is continuously displayed even while the user is swiping through different screens of application icons.

Optionally, a settings user interface is provided where the user can specify if character fonts and/or icons from the first computing device 504 are to be resized (e.g., to larger size or smaller size) on the supplemental display device 502. Optionally, the settings user interface may enable the user to specify that the character fonts and/or icons heights/widths are to be sized proportional to the ratio of the height of the display of the supplemental display device 502 to the height of the display of the first computing device 504 and the width of the display of the supplemental display device 502 to the width of the display of the first computing device 504. Optionally, the settings user interface may enable the user to specify a scaling percentage of the character fonts and/or icons. For example, the settings user interface may enable the user to specify a scaling percentage of 25%, 50%, 100%, 125%, 150%, 200%, 400% and/or other percentage via a menu of scaling percentages. The settings user interface may optionally enable the user to specify a scaling percentage by manually entering a percentage number into a scaling field.

The user scaling inputs may be stored in memory and utilized for scaling icons and fonts displayed on the supplemental display device 502.

The supplemental display device 502 may optionally use the Bluetooth interface to: communicate an unlock instruction to the first computing device 504; for pairing with the first computing device 504; for transmitting streaming commands (e.g., start, stop, pause, rewind, fast forward) to the first computing device 504; for receiving information regarding which applications are installed on the first computing device 504; for communicating a communication environment of the first computing device 504 (e.g., an indication as to whether the first computing device is connected to a cellular network, a WIFI access point, or the like); for enabling a hotspot function on the first computing device 504 (so that the supplemental display device can access the Internet via the first computing device 504 cellular connection); and/or to communicate audio-only content.

The supplemental display device 502 may use optionally the WIFI interface to: communicate video data with the first computing device 504 (e.g., stream video data or transmit video files from the first computing device 504 to the supplemental display device 502); communicate photographs with the first computing device 504; transmit raw data URLs (the portion of the URL following the domain information) for a video player; and/or transmit user touch inputs received at the supplemental display device 502 to the first computing device 504. The supplemental display device 502 may also use the WIFI interface to communicate with (e.g., via an access point) the remote system 506 over one more networks 506.

Communications from the supplemental display device 502 may be received and processed by the communication and synchronization application on the first computing device 504. It is understood that certain data or instructions described above as being communicated via Bluetooth may be communicated via WIFI and that certain data or instructions described above as being communicated via WIFI may be communicated via Bluetooth, although there may be adverse impacts.

When needed, data received over two or more communication channels (e.g., Bluetooth and WIFI) may be synchronized. For example, audio data received via the Bluetooth interface may be synchronized with a video stream received via the WIFI interface. When the supplemental display device 502 and first computing device 504 are paired, the date/time of the supplemental display device 502 may be synchronized with that of the first computing device 504. The communication and synchronization application on the first computing device 504 may associate a time stamp with a given video frame being transmitted from the first computing device 504 to the supplemental display device 502. Time stamps may also be associated with corresponding "frames" of the audio data. The audio and/or video data and associated data stamps may be received by the supplemental display device 502. The audio data and/or the video data may be buffered in memory on the supplemental display device 502. The supplemental display device 502 may use the timestamps to synchronize playback of the audio data and the video data. Optionally, the audio data and video data are not merged into a single stream during playback as such merging may unnecessarily utilize additional computing resources and may introduce lags in the video/data playback.

With respect to audio data, certain operating systems, such as the Android operating system, prevent third party application from grabbing audio data on the device (e.g., an Android device). For example, although the Android operating system provides a CAPTURE_AUDIO_OUTPUT permission, it may not be used by third-party applications. To overcome this challenge, a Bluetooth speaker Human Input Device (HID) module is provided which enables the communication and synchronization application on the first computing device 504 to obtain audio data on the first computing device 504 and pass the audio data to the supplemental display device 502 without requiring the use of the CAPTURE_AUDIO_OUTPUT permission or other permissions.

Optionally, unlike conventional mirroring, the supplemental display device 502 may be configured so that content displayed by the supplemental display device 502 is orientated (e.g., in landscape or portrait format) based on the orientation of the supplemental display device 502 (as detected using orientation sensors), and not the orientation of the first computing device 504. For example, content on the supplemental display device 502 may orientate from portrait to landscape (or vice versa) based on the detected user rotation of the supplemental display device 502 being held by the user, entirely independent of the orientation of the user's first computing device 504. By way of illustration, if the supplemental display device 502 is being held in a landscape mode, content displayed on the supplemental display device 502 will be formatted in landscape mode, even if the first computing device 504 is oriented in portrait mode. Thus, the orientation of the displayed interfaces of the supplemental display device 502 and the first computing device 504 may be decoupled from each other.

As noted elsewhere herein, optionally, the layout of the application ("app") icons presented on the supplemental display device 502 may arranged so as to match the layout of the application icons on the first computing device 504. Optionally instead, in order to take advantage of the relatively larger display of the supplemental display device 502, the application icon layout rendered on the supplemental display device 502 may be different than that of the custom user interface on the first computing device 504. For example, a given row of application icons displayed on the supplemental display device 502 may include more application icons than a row of application icons displayed on the first computing device 504. The supplemental display device 502 may optionally be configured to display more rows and columns of application icons than the first computer device 504. Thus, if it takes several screens to display all the application icons on the first computing device 504, it may take fewer screens to display those same application icons on the supplemental display device 502, requiring less swiping of screens by a user to access a desired icon. Optionally, the size of the application icons displayed on the supplemental display device 502 may be the same as the size of the application icons displayed on the first computing device 504 to avoid distortions or pixilation.

In general, the communication and synchronization application may obtain app icons/text, cookies, and/or passwords from the first device and may then store them in supplemental display device memory for utilization by the supplemental display device 502. Optionally, the communication and synchronization application installed on the first computing device 504 detects any new apps installed on the first device, transmits the app icon, text, and password (as appropriate or available) to the supplemental display device 502, and the supplemental display device 502 may then automatically display the app icon and/or text at a corresponding location, and use the app password as needed (e.g., to access a user account or data associated with the app).

Optionally, the supplemental display device 502 is configured to prevent an end user from downloading third party applications to the supplemental display device 502, thereby further ensuring the reliability and security of the supplemental display device 502 and reducing the utilization of non-volatile memory on the supplemental display device 502.

As described in greater detail elsewhere herein, the supplemental display device 502 may instruct the first computing device 504 to execute applications hosted on the first computing device 504, or may execute the application (e.g., a copy of the application) on the supplemental display device 502, or may instruct the remote system 506 to execute the application (e.g., a copy of the application or a version thereof). The supplemental display device 502 may detect user inputs (e.g., user touches on the on the supplemental display device touch display), determine what icon or icon control or menu item the user touched and/or the location of the touch, transmit corresponding information to the first computing device, which may then execute the corresponding action (e.g., launch a user select app or execute a user selection of a menu item or command).

Certain techniques may be utilized to reduce latency with respect to performing certain functions. For example, the supplemental display device 502 may include a data buffer which may be used to buffer data from the supplemental display device 502 to ensure that data is available as needed for the supplemental display device 502 to render, play, and/or process the data. Further, by receiving and processing raw data from the first computing device 504 (where the raw data is received by the first computing device 504 from another source, such as the Internet), rather than relying on the first computing device 504 to first process the data (e.g., to scale, decode or decrypt the data), the supplemental display device 502 has lower latency access to the data. In addition, if the supplemental display device 502 determines that the data rate/available bandwidth of data communication from the first computing device 504 is reduced (e.g., because of an increasing distance between the two devices or interference), the supplemental display device 502 may instruct the first computing device 504 to reduce the video quality being transmitted to the supplemental display device 502 to reduce the amount of data that needs to be transmitted to thereby reduce or entirely eliminate interruptions in video playback.

For example, the connection speed of the wireless network between the first computing device 504 and the supplemental display device 502 may optionally be tested as follows. The communication and synchronization application on the first computing device 504 may transmit one or more test bytes to the supplemental display device 502 in association with a time stamp. The supplemental display device 502 may determine at what time it received the test byte (using its internal clock), compare the receipt time with the timestamp, and determine the ping/delay time. If the ping time is unacceptable (e.g., greater than a threshold), the quality of the video being transmitted may be reduced so as to satisfy the threshold.

Optionally, to further reduce latency, if the communication and synchronization application on the first computing device 504 cannot determine or detect the exact locator (e.g., URL) of content (e.g., video content) the user is requesting via a webpage being accessed by the first computing device 504 (e.g., because the URL is malformed), where the content is to be rendered on the supplemental display device 502, the URL of the webpage currently being accessed may be transmitted to the remote system 506. For example, the communication and synchronization application on the first computing device 504 may transmit the webpage URL directly to the remote system 506, or, if the supplemental display device 502 is connected to an access point, the first computing device 504 may transmit the webpage URL to the supplemental display device 502, which may in turn transmit the webpage URL to the remote system 506. The remote system 506 may parse the corresponding webpage, determine the exact URL of the content, and transmit the exact URL to the supplemental display device 502 (directly or via the first computing device 504). The supplemental display device 502 may utilize the URL from the remote system 506 to request the video content. For example, if an access point is available via which the supplemental display device 502 can access the Internet, the supplemental display device 502 may access the content at the exact URL via the access point, without having to route the request to or otherwise utilize the first computing device 504. If an access point is not available, but the first computing device 504 has Internet access via its cellular radio, then the first computing device 504 may access the video content at the exact URL, and as it receives the video content, stream the video content to the supplemental display device 502, optionally without processing the video content via a video codec.

Where the first computing device 504 can determine the exact content URL and the supplemental display device 502 can access the Internet via an access point, the first computing device 504 may transmit the raw data URL to the supplemental display device 502. The supplemental display device 502 may utilize the raw data URL to access the video content at the raw data URL directly, without having to route the request to or otherwise utilize the first computing device 504. The requested video content may be streamed to the supplemental display device 502 which may render and playback the video content (e.g., using the native aspect ratio of the video content). This technique overcomes drawbacks associated with mirroring the playback of video content from a source device to a sink device. Such conventional mirroring techniques often leave one or more blank boarders around the video when rendered on the sink device. By contrast, the described technique optionally allows the video to be played back in full screen mode, without such borders (e.g., where the native aspect ratio of the video content matches the aspect ratio of the display of the supplemental display device 502). Optionally, if the native aspect ratio of the video content does not match the aspect ratio of the display of the supplemental display device 502, the video content will be scaled so as to be displayed in full screen mode on the supplemental display device 502. Optionally, a control may be provided via which the user can specify whether or not video content is to be scaled so as to be displayed in full screen mode on the supplemental display device 502, and the setting may be used for future playback of video content by the supplemental display device 502.

In order to conserve power and extend battery life, the supplemental display device 502 may determine, based on determined activity on the first computing device 504 and/or the supplemental display device 502, as to whether the first computing device 504 may be placed in a reduced power consumption mode. For example, if the supplemental display device 502 determines that it is playing a video, and determines, from information provided by the communication and synchronization application on the first computing device 504, that the user has not provided any user input on the first computing device 504 (e.g., via the first computing device 504 touchscreen) for at least a threshold period of time, the supplemental display device 502 may infer that the user it not utilizing the display of the first computing device 504 and the supplemental display device 502 may command the first computing device 504 to hibernate or reduce the brightness of its display. The hibernation command may also cause the first computing device 504 to reduce processing speed, turn off background applications, and/or take other power reduction actions that the first computing device 504 has been set up to take in response to a hibernation command.

The supplemental display device 502 may transmit a hibernate command or a reduce brightness command (e.g., if the first computing device 504 does not permit a remote display hibernate command, such as is the case in iOS devices) to the first computing device 504 using Wi-Fi Direct or Bluetooth (although other communication channels may be used). The communication and synchronization application on the first computing device 504 may detect the command, and accordingly cause the display to hibernate or to reduce its brightness (e.g., to zero or other level) and/or take other hibernation actions to thereby conserve power.

Optionally, the hibernation command may be automatically issued substantially immediately (e.g., within 1 second, within 30 seconds, within 60 seconds) after the supplemental display device 502 establishes a connection with the first computing device 504. Optionally, the supplemental display device 502 may wake up the first computing device 504 or change the brightness of the first computing device display via an instruction transmitted using its Bluetooth radio (although other communication channels may be used).

Optionally, the user may manually wake up or increase the brightness of the first computing device display and otherwise stop the hibernation process (e.g., by touching the first computing device touchscreen, by pressing a home or power control, etc.). Optionally, when the supplemental display device 502 changes the brightness of the first computing device display (e.g., from off or lowest brightness to visible), the supplemental display device 502 may utilize a global brightness value accessed from the first computing device 504 to set the first computing device display brightness. The communication and synchronization application on the first computing device 504 may access and store (e.g., in the User Settings class) the global brightness value after launching for later use in restoring display brightness when ending a hibernation state.

Optionally, the communication and synchronization application on the first computing device 504 may automatically mute the speakers of the first computing device 504 upon launch of the communication and synchronization application on the first computing device 504 or in response to connecting to the supplemental display device 502. Optionally, a user-accessible setting control may be provided via which a user can specify that the speakers of the first computing device 504 are not to be so automatically muted. Optionally, the communication and synchronization application on the first computing device 504 may automatically unmute the speakers in response to being disconnected from the supplemental display device 502. Optionally, the communication and synchronization application on the first computing device 504 enables the user to manually unmute the speakers of the first computing device 504 (e.g., by activating a volume control or unmute control on the first computing device 504).

The supplemental display device 502 may optionally be configured to be compatible with a large variety of computing devices, such as a wide variety of iOS-based phone models and a wide variety of Android-based phone models from different manufacturers, including those with different versions of iOS and Android operating systems and different versions of firmware. For example, the supplemental display device 502 may include multiple streaming applications, including a streaming application compatible with Windows-based device, a streaming application compatible with Samsung devices, and a streaming application compatible with Android-based devices. The supplemental display device 502 may determine what operating system the first computing device 504 is using and the device type, access a table that stores a matrix mapping operating systems and device types to applications, and utilize the appropriate applications in communicating data and instructions with the first computing device 504. By way of illustration, the supplemental display device 502 may utilize Miracast to capture display content on the first computing device 504, if available on the first computing device 504. If Miracast is not available and if the first computing device 504 is Android-based, the supplemental display device 502 may utilize the Media Projection API to capture display content on the first computing device 504. The UDP (User Datagram Protocol) protocol may be used to stream content from the first computing device 504 to the supplemental display device 502.

By way of further example, the matrix may map various combinations of manufacturer, manufacturer model, manufacturer manufacturing date (where two of the same model device from the same manufacturer, with the same operating system, may have different firmware), operating system, and/or operating system version to corresponding applications and instructions. The foregoing information may be transmitted by the first computing device 504 to the supplemental display device. This technique advantageously enables the supplemental display device 502 to be compatible with a wide variety of device models and versions of models from a given manufacturer and a wide variety of different devices from different manufacturers. For example, as described elsewhere herein, the supplemental display device 502 may utilize different commands to cause different types of computing devices to enter into a reduced power consumption state.

Dual mode functionality may be provided enabling the user to use an application on the first computing device 504 (e.g., to place a phone call) and simultaneously use an application (e.g., a social networking application or book reader application) on the supplemental display device 502. Optionally, the first computing device 504 may execute and perform the processing for the application being utilized on the first computing device 504. Optionally, a combination of the first computing device 504, the supplemental display device 502, and the remote system 506 may be utilized to execute and perform the processing for the application being utilized on the supplemental display device 502.

Optionally, the communication and synchronization application on the first computing device 504 enables a reverse operation, where user inputs on the first computing device 504 are used to determine what is displayed on one or on multiple supplemental display devices at the same time. This function enables a presenter to manage, from a first device, what is displayed on multiple supplemental display devices provided to an audience. For example, the presenter may be a teacher and the audience may comprise students. By way of further example, the foregoing function would enable a parent playing a movie on the parent's device (e.g., a phone) to cause the movie to be rendered on children's supplemental display devices. Optionally, a given supplemental display device may similarly transmit content (e.g., received from the first computing device 504) to multiple other user devices that have communication and synchronization application installed thereon so that the multiple other user devices display the content at the same time.

Optionally, the supplemental display device 502 may be used to relay voice instructions to the first computing device 504. By way of illustration, the supplemental display device 502 may determine, using the communication and synchronization application installed on the first computing device 504, what type of natural language processing service or other voice responsive personal assistant service is utilized by the first computing device 504. For example, if the first computing device 504 is determined to be an iOS-based device, the supplemental display device 502 may determine that the first computing device 504 utilizes the Ski® natural language processing service. If the first computing device 504 is determined to be an Android-based device, the supplemental display device 502 may determine that the first computing device 504 utilizes the Google Now natural language processing service. By way of further example, if the first computing device 504 is determined to be a Windows-based device, the supplemental display device 502 may determine that the first computing device 504 utilizes the Microsoft Cortana® natural language processing service. Based on the determined natural language processing service, the supplemental display device 502 may determine the triggering phrase for the determined natural language processing service (e.g., "Hey Siri" for the Ski service, "OK Google" for the Google Now service, "Hey Cortana" for the Cortana service, etc.).

The supplemental display device 502 may continuously monitor, using its microphone, user voice inputs and in response to detecting the corresponding trigger phrase from the user, transmit the trigger phrase (and a subsequent user voice command/request) and/or other trigger indication to the communication and synchronization application on the first computing device 504. The communication and synchronization application on the first computing device 504 may then provide the trigger phrase (and a subsequent user voice command/request) and/or other trigger indication to the natural language processing service. The response from the natural language processing service may then be transmitted to the supplemental display device 502 for reproduction (e.g., a text, image, and/or video response may be displayed; an audio response may be played by the supplemental display device 502).

If a non-voice trigger of the natural language processing service is received via another input method on the supplemental display device 502 (e.g., pressing of a home control for more than a threshold period of time), optionally the trigger indication may be similarly transmitted to the communication and synchronization application on the first computing device 504.

A user setting may be provided instructing the supplemental display device 502 not to relay natural language processing service triggers to the first computing device 504 and/or not to monitor the microphone on the supplemental display device 502 in the absence of a manual user instruction to do so.

Certain example aspects will now be discussed with reference to the figures.

Figure 6:
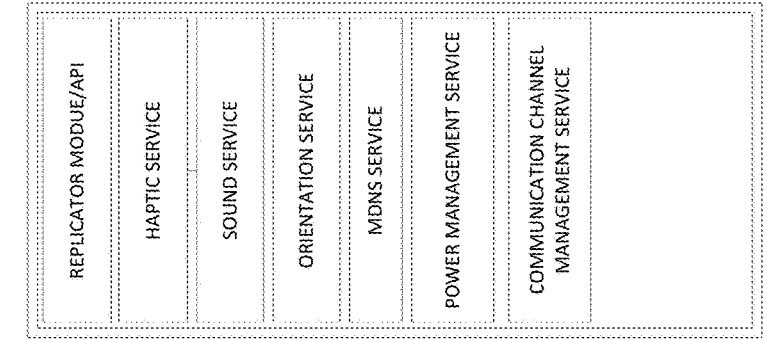
FIG. 6 illustrates example communication and synchronization architectures.
Figure 6:
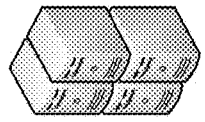
Figure 6:
Figure 6:
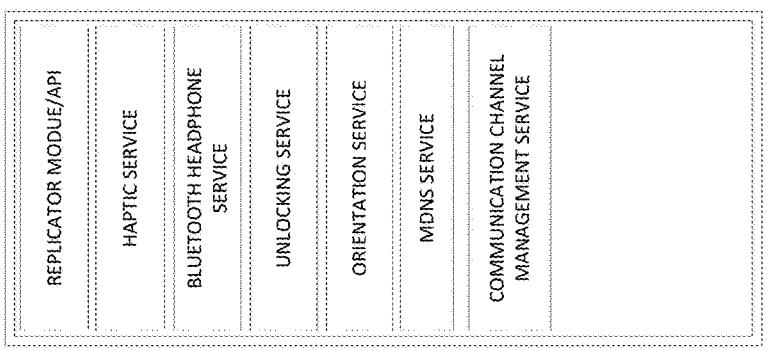

FIG. 6 illustrates an example communication and synchronization architecture for the first computing device 504 and for the supplemental display device 502. The first computing device 504 may include a replicator module and API, a haptic service (configured to detect user touches and the locations thereof), a wireless headphone service, an unlocking service, an orientation service, an mDNS service, and a communication channel management service. The supplemental display device 502 may include a replicator module and API, a haptic service, a sound service, an orientation service, an mDNS service, a power management service, and a communication channel management service. The various services and modules are described in greater detail elsewhere herein.

Figure 7:
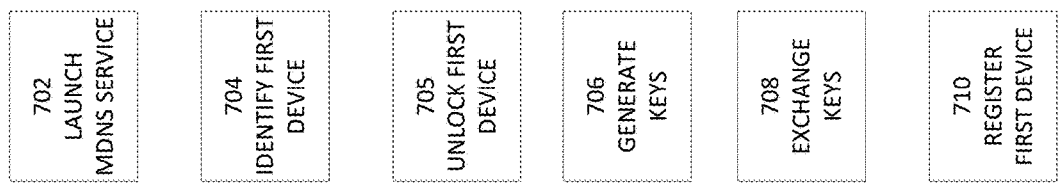
FIG. 7 illustrates an example device registration process.

FIG. 7 illustrates an example device registration process which may be utilized the first time a first device (e.g., a user phone, Internet of Things (IoT) device (e.g., a smart watch), small tablet computer, vehicle display, or other device) is "paired" with a supplemental display device. The process may be initiated in response to detecting a device pairing command. For example, a user may activate a pairing command on the supplemental display device, which may be detected by the supplemental display device operating system. At block 702, the supplemental display device launches an mDNS service or other resolving service. At block 704, the supplemental display device may utilize the mDNS service or other resolving service to search for and identify the first device. At block 705, the supplemental display device may transmit (e.g., using a Bluetooth communication channel) an unlock command to the first device. A communication and synchronization application ("CS application") on the first device may receive and detect the command and unlock the first device to so that the supplemental display device may access and utilize the first device's software and hardware.

For example, the CS application on the first device may start a Bluetooth-server-socket in a separate thread and wait for a connection with the supplemental display device. The supplemental display device connects to the Bluetooth socket, and the supplemental display device transmits an unlock command to the first device. The first device receives the unlock command at the communication and synchronization application, which in response, optionally turns on the first device display (if the display was off), and attempts to unlock the first device.

If the user's has set security mechanisms in place for unlocking the first device (e.g., a PIN, a graphical unlock pattern, biometrics, etc.), the unlock input may optionally be performed via the supplemental display device. For example, if the unlock input is to be provided via an unlock user interface on the first device, the unlock user interface may be displayed on the supplemental display device. The user can then provide (e.g., via touch) the needed unlock input via the unlock user interface on the supplemental display device. The supplemental display device will transmit the unlock inputs to the CS application on the first device, which will use the unlock inputs to unlock the first device (without the user having to touch or otherwise manually access the first device). If a biometric input is needed to unlock the first device, the supplemental display device may prompt the user to provide the biometric input via a corresponding sensor on the supplemental display device (e.g., a fingerprint sensor, a camera, iris reader, a microphone, etc.). Once the supplemental display device receives the biometric input, the supplemental display device will transmit the biometric input to the CS application on the first device, which will use the biometric input to unlock the first device. Optionally instead, the user may manually unlock the first device via user inputs on the first device itself.

At block 706, the supplemental display device may utilize a key generation module to generate two keys (e.g., a private key and a public key). At block 708, the supplemental display device transmits one of the keys (e.g., the public key) to the first device. At block 710, the supplemental display device registers the first device (e.g., stores the keys, receives and stores the telephone number of the first device, the Media Access Control (MAC) address of the first device (which uniquely identifies the first device), the IMEI of the first device, the ICCID of the first device, the MEID of the first device, and/or other information). The keys and/or the received MAC address of the first device may be used in the future to enable the supplemental display device to uniquely identify and authenticate the first device without having to go through the registration process, and so as to establish a secure and safe wireless connection. For example, a MAC address received during a registration operation may be compared with a MAC address received during a later connection operation, and in response to a determination that the MAC address received during the registration operation matches the MAC address received during the connection operation, verify the identity of the first device.

Figure 8:
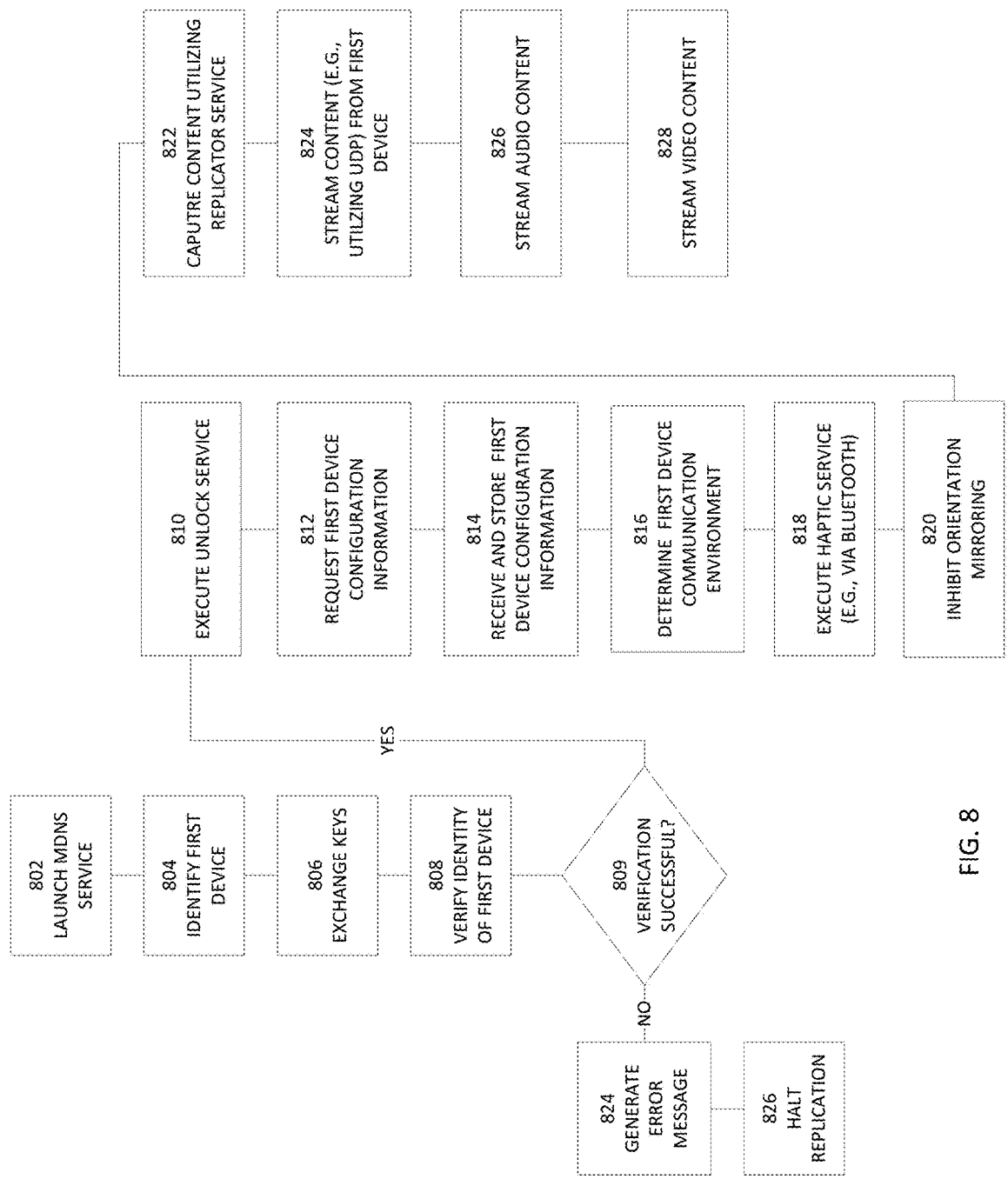
FIG. 8 illustrates an example replication process.

FIG. 8 illustrates an example replication process. At block 802, the supplemental display device launches an mDNS service or other resolving service. At block 804, the supplemental display device identifies the first device. At block 806, the first device transmits its MAC address to the supplemental display device. The first device may also transmit the public key it received during the initial registration process back to the supplemental display device. Optionally, a key exchange is performed where the supplemental display device and first device exchange their respective keys (that had been generated during the initial registration process). At block 808, the supplemental display device verifies the identity of the first device. At block 809, a determination is made as to whether the verification is successful. If the verification fails, at block 824, an error message may be generated and presented to the user via the supplemental display device, and at block 826 the replication process may terminate.

If the verification is successful, at block 810, an unlock service is executed at the supplemental display device, which commands the first device (e.g., via Bluetooth) to unlock as similarly discussed elsewhere herein. At block 812, the supplemental display device may transmit a request to the CS application on the first device for first device configuration information. For example, the first device configuration information may include some or all of the following: manufacturer, model, manufacturing data, release, operating system type (e.g., iOS, Windows, Android), operating system version. The first device may transmit the requested configuration information to the supplemental display device, which, at block 814, may receive and store in memory the received configuration information.

At block 816, the CS application on the first device may determine the communication environment of the first device. The determined communication environment may be utilized to dynamically determine how to manage wireless communications. For example, the CS application may determine whether the first device is connected to the Internet via Wi-Fi (e.g., via a Wi-Fi access point), via cellular service (e.g., LTE), or whether the first device is not connected to the Internet at all. The CS application on the first device may then transmit the communication environment data to the supplemental display device, which receives and stores the communication environment data.

As discussed below in greater detail with respect to FIG. 10, using the communication environment data, the supplemental display device may setup multiple channels of communication. For example, the supplemental display device may determine that certain commands or data are to be transmitted to the cloud server system discussed above, and certain commands or data are to be transmitted to directly to the first device. By way of further example, the display device may determine that certain commands or data are to be transmitted directly to the first device via Wi-Fi Direct, and certain other commands or data are to be transmitted using Bluetooth, and still other commands or data are to be communicated to an access point which may then communicate the commands to the first device or the remote cloud server system. Optionally, the user may still be able to access services of the first device in a conventional fashion.

For example, if the first device is a phone, the user may still pick up the phone, dial a phone number, and place a call without interfering with the supplemental display device's ability to access applications on the first device or the ability to access content being accessed by such applications (e.g., video content, still image content, graphic content, text content, Web pages, etc.). This architecture enables the supplemental display device to have the first device's applications executed in real-time.

At block 818, a haptic service is executed. In the context of utilizing a mouse HID pathway, the haptic service may optionally utilize absolute positioning with respect to user touch inputs to avoid the technical problems of relative positioning, where the user would have to indicate a 0,0 position at the beginning of each session. At block 820, orientation synchronization between the supplemental display device and the first device may be inhibited. For example, the supplemental display device may transmit a command to the CS application not to communicate orientation information of the first device to the supplemental display device. This enables images on the supplemental display device to be oriented based on the detected user orientation of the supplemental display device being held by the user rather than the orientation of the first device. Optionally, a control may be provided via the supplemental display device via which the user can instruct the supplemental display device to synchronize its display orientation with that of the first device.

At block 822, a replicator service may be executed on the first device. The replicator service may negotiate connection settings and may copy what is displayed on the first device display to the supplemental display device (e.g., utilizing an image capture application, such as Miracast or the Media Projection API) for display. A token may be provided to the replicator service granting the ability to capture screen content and/or audio content. At block 818, content from the first device is streamed to the supplemental display device (e.g., utilizing a transport layer, such as User Datagram Protocol (UDP)). At block 826, an audio service is executed and audio content is streamed from the first device to the supplemental display device (e.g., using Bluetooth). At block 828, the video is streamed from the first device to the supplemental display device (e.g., using Wi-Fi Direct).

The haptic service described above may be implemented differently for different first device operating systems. For example, if the first device utilizes the Apple® iOS operating system, all the available touch events may be handled (e.g., tap, swipe, expand, pinch, rotate, etc.). For a given touch event, iOS may generate the following example notifications, as applicable: Begin, Move, End, etc. Using touch event coordinates generated on the supplemental display device side (considering the aspect ratio), touch events on the supplemental display device may be applied on the iOS device. The touch event coordinates may be transmitted (with comments that indicate the type of touch event, such as tap, expand, pinch, rotate, etc.) from the supplemental display device to the iOS device. The iOS device detects receipt of such comments, and using the comments, determines what command (haptic function) to perform and with what parameters (e.g., positioning) to perform such command.

In order to ensure that the foregoing process is reliable and repeatable, certain optional techniques may be utilized. The displays of the supplemental display device and the iOS device may be mapped so that they match. In particular, coefficients for the aspect ratio are calculated. For example, a width coefficient may be calculated that equals the supplemental display device screen width divided by the iOS device screen width. Similarly, a height coefficient may be calculated that equals the supplemental display device screen height divided by the iOS device screen height.

By way of illustrative example, if the iOS device has a 320×480 pixel screen size and the supplemental display device has a 2560×1600 screen size, then:

Width coefficient=1600/320=5.0
Height coefficient=2560/480=5.3333

So, for example, if the user taps the middle of the supplemental display device screen (where the screen is 2560×1600):

The tap screen coordinate is (2560/2, 1600/2)=(1280, 800)

Then, using the calculated width and height coefficients, the scaled coordinate for iOS device may be calculated as follows:

Scaled coordinate=(1280/5, 800/5.33333)=(256, 150), which is the middle of 320×480 display of the iOS device in this example.

Thus, the coefficients may be used to accurately map a touch on the display of the supplemental display device to the corresponding position on the iOS device, and the CS application on the iOS device may virtually "tap" the corresponding position on the iOS device to carry out the operation desired by the user. In addition, the foregoing data may be packed into an object which is transmitted to the first device, further reducing latency issues.

Where the first device the Android operating system, the supplemental display device may emulate a Bluetooth Human Input Device (HID), such as a track pad or mouse. A determination is made (e.g. by the supplemental display device or the CS application on the first device) as to what type of HID device is supported by the Android device, the determination may be stored for later use, and the supplemental display device may be configured to mimic the supported HID device using a HID descriptor.

If the Android device supports multiple HID devices, a determination may be made if it supports a track pad, and if so, the supplemental display device may be configured to mimic the track pad. If the Android device does not support a track pad, a determination may be made if it supports a mouse, and if so, the supplemental display device may be configured to mimic the mouse, and so on.

After the initial pairing, the supplemental display device may access from memory an indication as to what type of HID device it should emulate without having to make the determination again.

Optionally, a HID descriptor for a touchpad may be embedded into the supplemental display device firmware so that other devices (e.g., Android devices) can find the 'virtual HID' and utilize it.

However, for an Android device, HID speed is an issue, which, conventionally, would make the user of a virtual mouse unusable in a real-world case. In other words, as the user moves the "mouse" (e.g., the user's finger or a stylus) on the supplemental display device display, the movement/touch data transmitted to the first device is so erratic that that it will not adequately reflect the "mouse" movements. Conventionally, even if the user is moving the "mouse" a steady speed, the movement data appears as bursts of fast movements with stops in a non-uniform function. This technical problem is overcome by recalculating into absolute coordinates. When the user taps the supplemental display device screen, the 0,0 coordinate is set to the upper left hand corner of the supplemental display device screen and of the first device screen, and this enables the remapping of the grid. Further, the movement and comment data may be transmitted together as an object to the first device.

Figure 9:
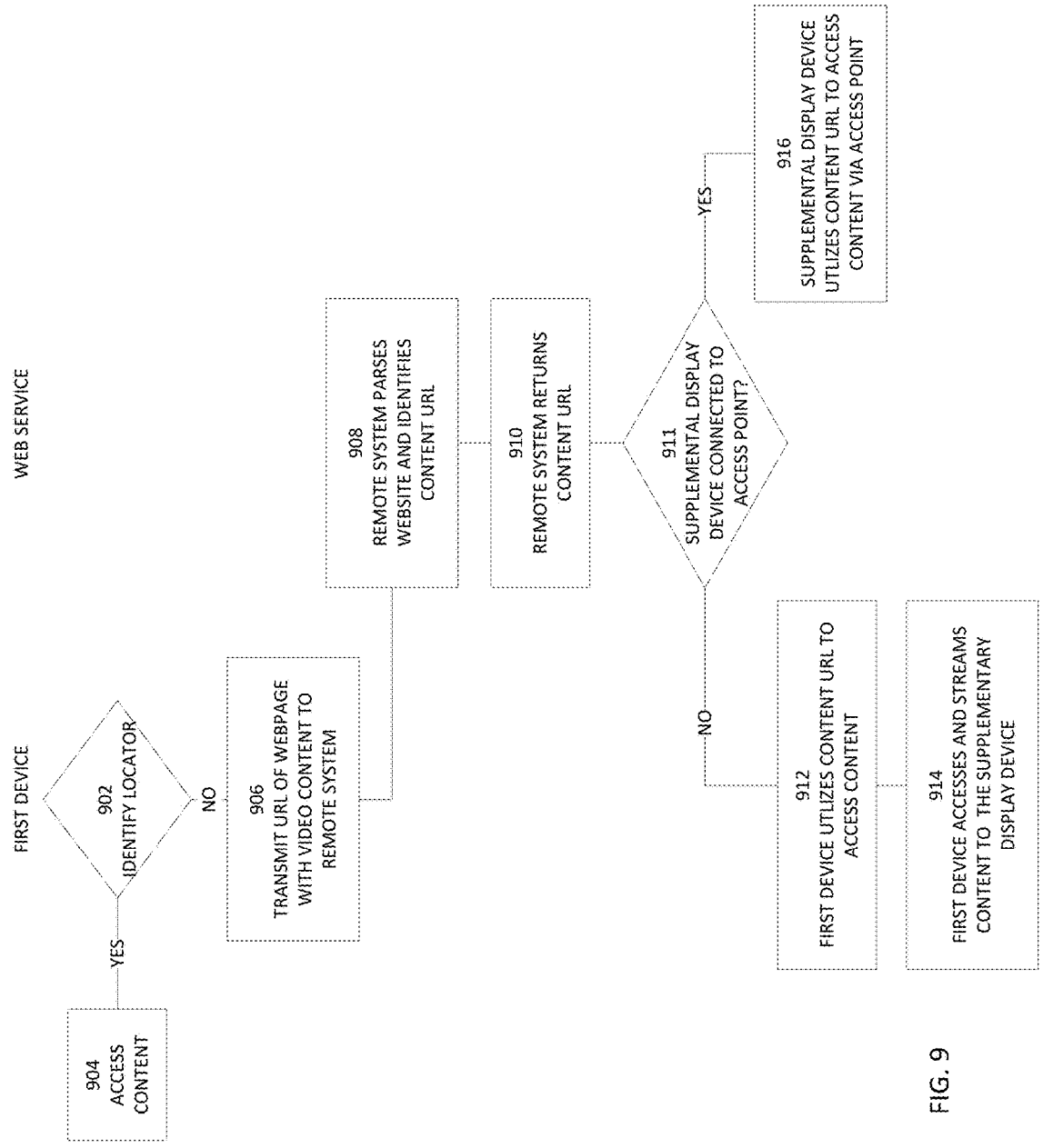
FIG. 9 illustrates an example distributed content access process.

FIG. 9 illustrates an example process of utilizing a service, such as a Web service, to locate and stream content when the CS application is unable to ascertain the content location (e.g., the content URL). At block 902, a first device identifies a locator (e.g., a URL) related to video content being requested by the supplemental display device (e.g., in response to a user request). For example, the request for video content may be initiated in response to a user input received via the touchscreen or microphone of the supplemental display device. If the locator precisely identifies the video content, then at block 904, the content is accessed. For example, if the an access point is available via which the supplemental display device can access the Internet, the supplemental display device may access the content at the locator via the access point, without having to route the request to or otherwise utilize the first device. If an access point is not available, but the first computing device has Internet access via its cellular radio, then the first may access the video content at the locator, receives the streamed video content, and wireless sly transmit the streamed video content to the supplemental display device via the CS application (e.g., via Wi-Fi Direct).

If the locator does not precisely identify the video content (e.g., the locator is a webpage URL on which video content is embedded), than at block 906, the locator is transmitted to a remote system, such as the cloud-based server system discussed elsewhere herein. At block 908, the remote system receives the locator, accesses the document (e.g., webpage) and/or website the locator is pointing to, parses the document and/or website and identifies the precise locator (e.g., URL) for the video content. At block 910, the video content locator is returned by the remote system to the first device.

At block 911, a determination is made as to whether the first device is connected to a WIFI access point. If the first device is not connected to a WIFI access point, then at block 912, the first device utilizes the locator to access the video content, using its cellular radio, via streaming, and, at block 914, transmits the raw streamed video content (optionally without decoding the video content) to the supplemental display device via the CS application (e.g., via a Wi-Fi Direct connection). The supplemental display device may render and display the streamed video content. By utilizing the raw video content streamed from the first device, rather than processed video content from the first device, and performing any needed processing on the supplemental display device, the playback quality may be higher, artifacts may be reduced or avoided altogether, and the user experience may be enhanced. However, optionally, the video content may be first processed on the first device and then transmitted to the supplemental display device for display.

If the first device is connected to a WIFI access point, then at block 916, the supplemental display device access the WIFI access point address from the first device. At block 918, the supplemental display device utilizes the locator to access, via the access point, the video content via streaming, and processes, renders and displays the streamed video content, without having the video content routed via the first device.

Although the foregoing example is directed to video content, optionally the process may be similarly used for other content, such as audio content.

Figure 10:
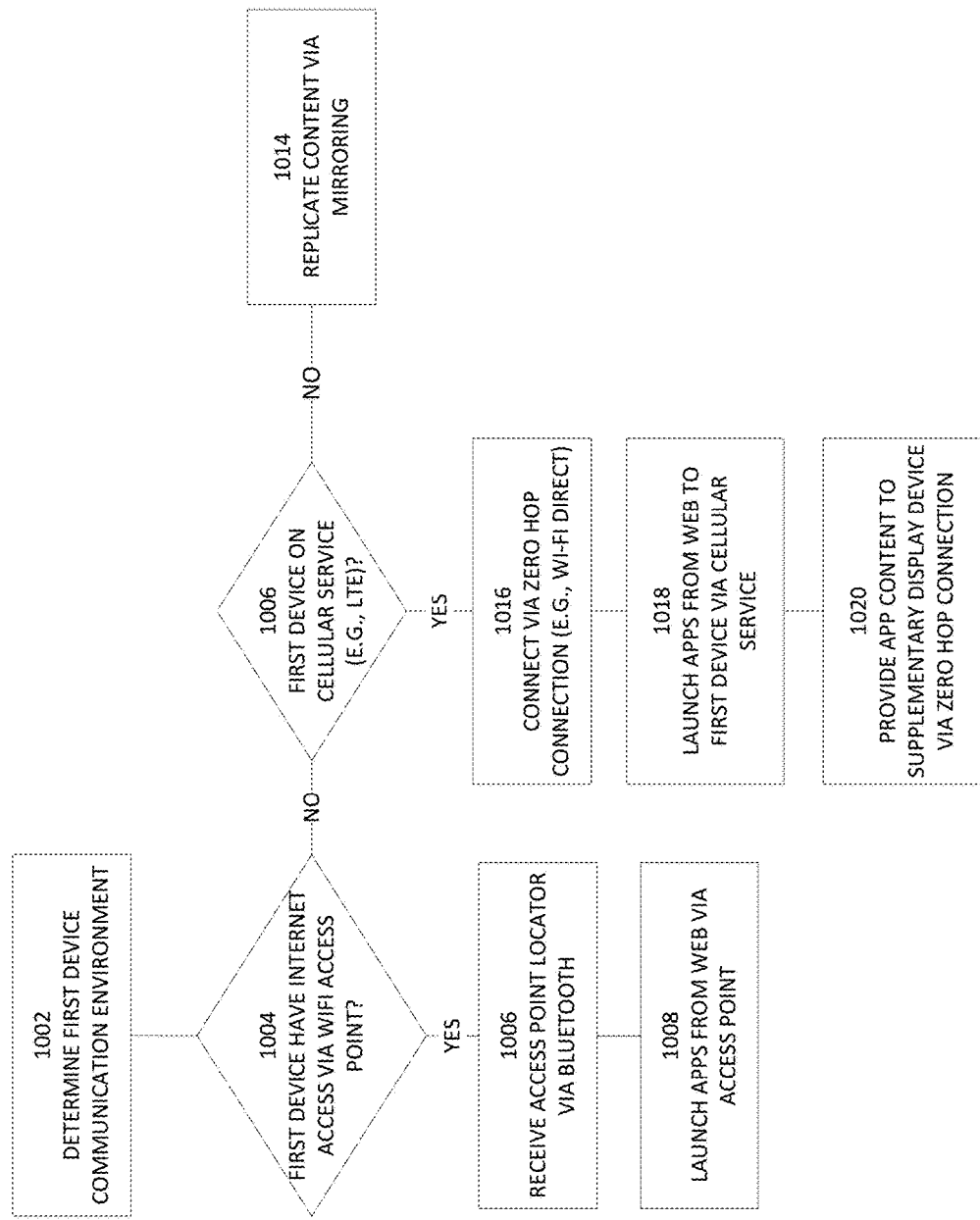
FIG. 10 illustrates an example communication management process.

FIG. 10 illustrates an example process for utilizing information regarding a communication environment for a first device in determining how content is to be accessed and how communications are to be managed. At block 1002, the first device's communication environment is determined. For example, the CS application on the first device may determine and transmit to the supplemental display device the communication environment data (e.g., via a Bluetooth connection). At block 1004, a determination is made as to whether the first device can access the Internet via a Wi-Fi access point. If the first device cannot access the Internet via a Wi-Fi access point, then at block 1006, a determination is made as to whether the first device can access a cellular service (e.g., LTE).

If the first device cannot access either cellular service or a Wi-Fi Internet access point, then at block 1014, then content already stored in memory of the first device's display may be transmitted (e.g., streamed) for reproduction on the supplemental display device. Audio content may be transferred from the first device and to the supplemental display device via a Bluetooth connection and video or GUI content may be transferred from the first device to the supplemental display device via a Bluetooth connection or via a zero hop (e.g., Wi-Fi Direct) connection.

If the first device can access a Wi-Fi Internet access point, then at block 1006, the supplemental display device may access (e.g., via a Bluetooth connection) the locator (e.g., the URL) of the access point the first device is connected to, and the supplemental display device may connect to the same URL point. At block 1008, one or more applications are launched from the Web to the supplemental display device, and respective Web services are accessed by the supplemental display device via the Wi-Fi Internet access point. Advantageously, a Web version of a given application may provide an enhanced user interface and/or additional functionality as compared to the application installed on the first device. The supplemental display device may receive login information (e.g., a UserID and/or password) for the user account associated with the given application and may submit the login information via a user interface or API of the Web version of the application to login and enable the user to access the user's account, page, and/or other information. Video may be streamed directly from the access point to the supplemental display device. Optionally, audio content may be transferred from the first device and to the supplemental display device via the already existing Bluetooth connection. When exiting out of an app back to the grid of app icons, the grid user interface of apps generated by the supplemental display device may be presented, solving the problem of traditional mirroring and compatibility issues of aspect ratio, scale of icons/text, lost areas of screen, cropping, etc.

If it is determined that the first device has access to a cellular service but not a Wi-Fi access point, then at block 1016, the first device connects to the supplemental display device using a zero hop connection (e.g., via a Wi-Fi Direct), in addition to the already-opened Bluetooth connection. Audio content may be transferred from the first device and to the supplemental display device via the zero hop connection (e.g., Wi-Fi Direct). At block 1018, one or more applications are launched and access, using the first device's cellular radio, respective Web services via the cellular service. At block 1020, data accessed by app(s) on the first device are transmitted to the supplemental display device via the zero hop connection. The user interfaces of launched applications may also be transmitted from the first device to the supplemental display device for display.

Thus, for example, a determination may be made as to the first device's communication environment, and then, if available, utilize the access point option to access the Internet, and if the access point option is not available, utilize the first device's cellular service (e.g., LTE) to access the Internet, and if the access point and cellular service are both not available, utilizing content mirroring without accessing the Internet. The process may constantly monitor the communication environment, so that if there is a change in the availability of access point or cellular service availability, the process may repeat and the communications be according redirected in real time and seamlessly so that there is no user-perceived change in their use.

An example process for configuring the layout of app icons (or text) will be described. A first virtual grid is generated for the first device display and a second virtual grid is generated for the supplemental display device display. The vertical and horizontal placement of the grid lines for the first and second grids are spaced so that they define grid squares or rectangles of the same size in the first and second grids. However, if the supplemental display device has a larger display than the first device, then the supplemental display device grid will have more grid lines and a greater number of grid areas (e.g., squares or rectangles) defined by the grid lines, even though each grid area is the same size as that of the first grid for the first device.

For example, if the display of the supplemental display device has four times the area of the display of the first device, then the second grid may have four times as many grid lines as the first grid. Application icons from the first device are accessed by the supplemental display device and displayed by the supplemental display device using the second grid (optionally using the same layout as the first device's layout, as generated by the CS application), with the icons being the same size or substantially the same size (e.g., +/−5% or +/−10%) as on the first device. This makes additional display space available on the supplemental display device (e.g., for work/entertainment or to display additional icons at the same time).

By contrast, conventional mirroring may scale the icons by a factor proportional to the increase in display size. Thus, if a source device is being mirrored on a sink device that has a display that is four times larger than that of the source device, the icons displayed by the sink device may be four times the size as that of the icons displayed on the source device. This can result in icons that are awkward in size and pixilation, and does not make additional display space available on the sink device display (e.g., for work/entertainment or to display additional icons at the same time).

Figure 11:
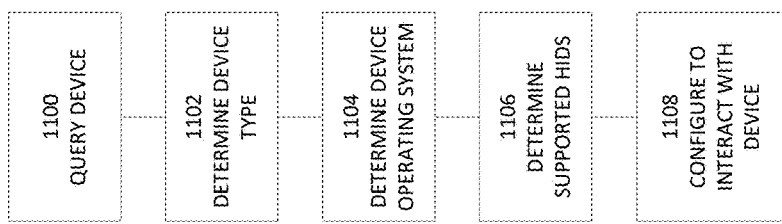
FIG. 11 illustrates an example process of adapting a supplemental display for use with other devices.

FIG. 11 illustrates an example process of determining characteristics of the first device so that the supplemental display device can adequately communicate with and control the first device. At block 1100, the supplemental display device queries the CS application on the first device to determine characteristics of the first device and receives corresponding information from the CS application. At block 1102, the supplemental display device utilizes the received information to determine the device type (e.g., manufacturer, model, release, height of display in pixels, width of display in pixels, etc.). At block 1104, the supplemental display device utilizes the information to determine the device operating system (e.g., iOS or Android). At block 1106, the supplemental display device utilizes the information to identify one or more of the HIDs supported by the device (e.g., track pad, mouse, etc.). At block 1108, the supplemental display device utilizes the device type information, the operating system type, and the supported HIDs to calculate aspect ratio coefficients, to determine how to reduce power consumption of the first device (e.g., whether to hibernate the first display device or reduce the first display device brightness to zero or as low as permitted), how to grab audio content on the first device, how to grab display content on the first device, to determine what HID to emulate, and/or to perform other functions described herein.

Thus, systems and methods are provided to enable a supplemental display device to reliably and accurately display data from a paired device (e.g., via a larger display), control the paired device, manage communications with the paired device, and/or provide other functions described herein.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integer to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface or in response to a prompt (e.g., a voice or text prompt). By way of example an interface may include text fields, wherein a user provides input by entering text into the field. By way of further example, a user input may be received via a menu selection (e.g., a drop down menu, a list or other arrangement via which the user can check via a check box or otherwise make a selection or selections, a group of individually selectable icons, a menu selection made via an interactive voice response system, etc.). When the user provides an input or activates a control, a corresponding computing system may perform a corresponding operation (e.g., store the user input, process the user input, provide a response to the user input, etc.). Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone, a VoIP equipped mobile device, etc.), laptop, tablet computer, interactive television, game console, media streaming device, head-wearable display, virtual reality display/headset, augmented reality display/headset, networked watch, etc. The user terminals may optionally include displays, user input devices (e.g., touchscreen, keyboard, mouse, voice recognition, etc.), network interfaces, etc.

Certain aspects are described in U.S. patent application Ser. No. 15/645,997, entitled "SYSTEMS AND METHODS FOR A SUPPLEMENTAL DISPLAY SCREEN," filed Jul. 10, 2017, which is incorporated by reference herein in its entirety. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

What is claimed is:

1. A supplemental display device configured to be used with a first computing device having a first display, comprising:
   a casing;
   a touchscreen display;
   a control system disposed within the casing and electrically coupled to the touchscreen display, wherein the control system is configured to perform operations comprising:
      establish a direct wireless connection with the first computing device;
      access, using the direct wireless connection, information regarding an operating system utilized by the first computing device;
      determine activity on the first computing device and/or the supplemental display device;
      using the determined activity on the first computing device and/or the supplemental display device, determine whether the first computing device is to be placed in a reduced power consumption mode;
      using the information regarding an operating system utilized by the first computing device, determine what commands are to be used to reduce power consumption by the first computing device; and
      at least partly in response to a determination that the first computing device is to be placed in a reduced power consumption mode, transmit, via the direct wireless connection, the determined commands to the first computing device to reduce power consumption of the first computing device.

2. The supplemental display device as defined in claim 1, wherein determining activity on the first computing device and/or the supplemental display device further comprises:
   determine whether the supplemental display device is playing content; and
   determine whether a user has not provided any user input to the first computing device for a threshold period of time.

3. The supplemental display device as defined in claim 1, wherein determining activity on the first computing device and/or the supplemental display device further comprises:
   determine whether the supplemental display device has established a connection with the first computing device; and
   wherein the determined commands are configured to at least hibernate or reduce brightness of a display of the first computing device.

4. The supplemental display device as defined in claim 1:
   wherein determining activity on the first computing device and/or the supplemental display device further comprises determining whether a user has not provided any user input to the first computing device for a threshold period of time, and
   wherein the determined commands are configured to at least hibernate or reduce brightness of a display of the first computing device and reduce processing speed on the first computing device.

5. The supplemental display device as defined in claim 1:
   wherein determining activity on the first computing device and/or the supplemental display device further comprises determining whether a user has not provided any user input to the first computing device for a threshold period of time, and
   wherein the determined commands are configured to at least hibernate or reduce brightness of a display of the first computing device.

6. The supplemental display device as defined in claim 1:
   wherein determining activity on the first computing device and/or the supplemental display device further comprises determining whether a user has not provided any user input to the first computing device for a threshold period of time, and
   wherein the determined commands are configured to at least reduce processing speed on the first computing device.

7. The supplemental display device as defined in claim 1:
   wherein determining activity on the first computing device and/or the supplemental display device further comprises determining whether a user has not provided any user input to the first computing device for a threshold period of time, and
   wherein the determined commands are configured to at least turn off background applications.

8. The supplemental display device as defined in claim 1, wherein the determined commands are configured to hibernate or reduce brightness of a display of the first computing device, the operations further comprising:
    access a brightness setting on the first computing device prior to transmission of the determined commands to the first computing device to reduce power consumption by the first computing device; and
    at least partly in response to a first detected event, transmit a command to the first computing device to restore the accessed brightness setting.

9. The supplemental display device as defined in claim 1:
    wherein when the information regarding an operating system indicates that the operating system is a first type of operating system, the determined commands to be used to reduce power consumption by the first computing device comprise a command to change a brightness level of a display of the first computing device; and
    wherein when the information regarding an operating system indicates that the operating system is a second type of operating system, the determined commands to be used to reduce power consumption by the first computing device comprise a hibernation command.

10. The supplemental display device as defined in claim 1, wherein the determination as what commands are to be used to reduce power consumption by the first computing device is based in part on manufacturer and model information.

11. The supplemental display device as defined in claim 1, the operations further comprising automatically establish, upon power-up of the supplemental display device, the direct wireless connection between the supplemental display device and the first computing device.

12. The supplemental display device as defined in claim 1, wherein the operations further comprise:
    receive a MAC address from the first computing device during a registration operation;
    receive a MAC address from the first computing device during a connection operation subsequent to the registration operation; and
    perform an identity verification process using a comparison of the MAC address received during the registration operation with the MAC address received during the connection operation.

13. The supplemental display device as defined in claim 1, wherein the operations further comprise:
    utilize a Bluetooth link with the first computing device to receive audio content from the first computing device; and
    utilize a direct WIFI link to the first computing device to receive video content associated with the audio content from the first computing device.

14. The supplemental display device as defined in claim 1, wherein the operations further comprise:
    authenticate the first computing device; and
    automatically transmit the determined commands to the first computing device after authenticating the first computing device.

15. The supplemental display device as defined in claim 1, wherein the operations further comprise: transmit an unlock command to the first computing device.

16. A computer implemented comprising:
    establishing a direct wireless connection between a supplemental display device and a first computing device;
    accessing, by the supplemental display device, using the direct wireless connection, information regarding an operating system utilized by the first computing device;
    determining, by the supplemental display device, activity on the first computing device and/or the supplemental display device;
    using the determined activity on the first computing device and/or the supplemental display device, determining whether the first computing device is to be placed in a reduced power consumption mode;
    using the information regarding an operating system utilized by the first computing device, determining, by the supplemental display device, what commands are to be used to reduce power consumption by the first computing device; and
    at least partly in response to a determination that the first computing device is to be placed in a reduced power consumption mode, transmitting, via the direct wireless connection, the determined commands from the supplemental display device to the first computing device to reduce power consumption by the first computing device.

17. The method as defined in claim 16, wherein determining activity on the first computing device and/or the supplemental display device further comprises:
    determining whether the supplemental display device is playing content; and
    determining whether a user has not provided any user input to the first computing device for a threshold period of time.

18. The method as defined in claim 16, wherein determining activity on the first computing device and/or the supplemental display device further comprises:
    determining whether the supplemental display device has established a first connection with the first computing device; and
    wherein the determined commands are configured to at least hibernate or reduce brightness of a display of the first computing device.

19. The method as defined in claim 16:
    wherein determining activity on the first computing device and/or the supplemental display device further comprises determining whether a user has not provided any user input to the first computing device for a threshold period of time, and
    wherein the determined commands are configured to at least hibernate or reduce brightness of a display of the first computing device and reduce processing speed on the first computing device.

20. The method as defined in claim 16:
    wherein determining activity on the first computing device and/or the supplemental display device further comprises determining whether a user has not provided any user input to the first computing device for a threshold period of time, and
    wherein the determined commands are configured to at least hibernate or reduce brightness of a display of the first computing device.

21. The method as defined in claim 16:
    wherein determining activity on the first computing device and/or the supplemental display device further comprises determining whether a user has not provided any user input to the first computing device for a threshold period of time, and
    wherein the determined commands are configured to at least turn off background applications.

22. The method as defined in claim 16, wherein the determined commands are configured to hibernate or reduce brightness of a display of the first computing device, the method further comprising:

accessing a brightness setting on the first computing device prior to transmission of the determined commands to the first computing device to reduce power consumption by the first computing device; and at least partly in response to a first detected event, transmitting a command to the first computing device to restore the accessed brightness setting.

23. The method as defined in claim 16:
wherein when the information regarding an operating system indicates that the operating system is a first type of operating system, the determined commands to be used to reduce power consumption by the first computing device comprise a command to change a brightness level of a display of the first computing device; and wherein when the information regarding an operating system indicates that the operating system is a second type of operating system, the determined commands to be used to reduce power consumption by the first computing device comprise a hibernation command.

24. The method as defined in claim 16, wherein the determination as what commands are to be used to reduce power consumption by the first computing device is based in part on manufacturer and model information.

25. The method as defined in claim 16, the method further comprising automatically establishing, upon power-up of the supplemental display device, the direct wireless connection between the supplemental display device and the first computing device.

26. The method as defined in claim 16, the method further comprising:
authenticate the first computing device; and
automatically transmit the determined commands to the first computing device after authenticating the first computing device.

27. Non-transitory computer-readable media including computer-executable instructions that, when executed by computer system, cause the computer system to at least:
establish a wireless connection with the first computing device;
access, using the wireless connection, information regarding an operating system utilized by the first computing device;
determine activity on the first computing device and/or the supplemental display device;
using the determined activity on the first computing device and/or the supplemental display device, determine whether the first computing device is to be placed in a reduced power consumption mode;
using the information regarding an operating system utilized by the first computing device, determine what commands are to be used to reduce power consumption by the first computing device; and
at least partly in response to a determination that the first computing device is to be placed in a reduced power consumption mode, transmit, via the wireless connection, the determined commands to the first computing device to reduce power consumption by the first computing device.

28. The non-transitory computer-readable media as defined in claim 27, wherein determining activity on the first computing device and/or the supplemental display device further comprises:
determine whether the supplemental display device has established a connection with the first computing device; and
wherein the determined commands are configured to at least hibernate or reduce brightness of a display of the first computing device.

29. The non-transitory computer-readable media as defined in claim 27, wherein when the information regarding an operating system indicates that the operating system is a first type of operating system, the determined commands to be used to reduce power consumption by the first computing device comprise a command to change a brightness level of a display of the first computing device; and
wherein when the information regarding an operating system indicates that the operating system is a second type of operating system, the determined commands to be used to reduce power consumption by the first computing device comprise a hibernation command.

30. The non-transitory computer-readable media as defined in claim 27, wherein the determination as what commands are to be used to reduce power consumption by the first computing device is based in part on manufacturer and model information.

* * * * *

UNITED STATES PATENT AND TRADEMARK OFFICE
CERTIFICATE OF CORRECTION

PATENT NO. : 10,244,565 B2
APPLICATION NO. : 16/013274
DATED : March 26, 2019
INVENTOR(S) : Brent Foster Morgan It is certified that error appears in the above-identified patent and that said Letters Patent is hereby corrected as shown below:

On the Title Page

Item (56), Column 2, Line 12: Under Other Publications, change "/intedrateddevices/" to --/integrateddevices/--.

In the Drawings

On Sheet 6 of 11, (Reference Numeral 502), (FIG. 6), Line 1: Change "MODUE/" to --MODULE/--.

On Sheet 6 of 11, (Reference Numeral 504), (FIG. 6), Line 1: Change "MODUE/" to --MODULE/--.

On Sheet 8 of 11, (Reference Numeral 822), (FIG. 8), Line 1: Change "CAPUTRE" to --CAPTURE--.

On Sheet 8 of 11, (Reference Numeral 824), (FIG. 8), Line 2: Change "UTILZING" to --UTILIZING--.

On Sheet 9 of 11, (Reference Numeral 912), (FIG. 9), Line 1: Change "UTLIZES" to --UTILIZES--.

On Sheet 9 of 11, (Reference Numeral 916), (FIG. 9), Line 2: Change "UTLIZES" to --UTILIZES--.

In the Specification

On Column 4, Line 34: Change "process." to --process;--.

On Column 25, Line 28: Change "Ski" to --Siri--.

On Column 30, Line 4: Change "that that" to --that--.

On Column 30, Line 11: Change "0,0" to --0, 0--.

Signed and Sealed this
Second Day of July, 2019

Andrei Iancu
*Director of the United States Patent and Trademark Office*

CERTIFICATE OF CORRECTION (continued)
U.S. Pat. No. 10,244,565 B2

On Column 30, Line 27: Change "the an" to --an--.

On Column 30, Line 35: Change "wireless sly" to --wirelessly--.

In the Claims

On Column 37, Line 61, Claim 16: after "computer implemented", insert --method--.